US010769095B2

(12) United States Patent
Suzuki

(10) Patent No.: US 10,769,095 B2
(45) Date of Patent: Sep. 8, 2020

(54) IMAGE PROCESSING APPARATUS

(71) Applicant: CANON KABUSHIKI KAISHA, Tokyo (JP)

(72) Inventor: Jun Suzuki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 115 days.

(21) Appl. No.: 15/653,630

(22) Filed: Jul. 19, 2017

(65) Prior Publication Data

US 2018/0024965 A1  Jan. 25, 2018

(30) Foreign Application Priority Data

Jul. 20, 2016 (JP) ................................. 2016-142719
Jun. 5, 2017 (JP) ................................. 2017-111170

(51) Int. Cl.

| G06F 15/163 | (2006.01) |
| G06F 3/06 | (2006.01) |
| G06F 1/32 | (2019.01) |
| G06F 1/3293 | (2019.01) |
| G06F 1/3206 | (2019.01) |
| G06F 1/3287 | (2019.01) |

(52) U.S. Cl.
CPC .............. *G06F 15/163* (2013.01); *G06F 1/32* (2013.01); *G06F 1/3206* (2013.01); *G06F 1/3287* (2013.01); *G06F 1/3293* (2013.01); *G06F 3/0634* (2013.01); *Y02D 10/122* (2018.01); *Y02D 10/171* (2018.01)

(58) Field of Classification Search
CPC ........ G06F 15/163; G06F 3/0634; G06F 1/32; G06F 1/3287; G06F 1/3293; G06F 1/3206; Y02D 10/171; Y02D 10/122
See application file for complete search history.

(56) References Cited

U.S. PATENT DOCUMENTS 8,195,040 B2 * 6/2012 Shirakawa ............. G03B 15/05
396/56
8,793,521 B2 * 7/2014 Okuda ............... G03G 15/5004
713/323

(Continued)

FOREIGN PATENT DOCUMENTS

| JP | 4048334 B2 * | 2/2008 | ............. H04N 5/772 |
| JP | 2013-003986 A | 1/2013 | |
| JP | 2014-216668 A | 11/2014 | |

*Primary Examiner* — Kostas J Katsikis
(74) *Attorney, Agent, or Firm* — Cowan, Liebowitz & Latman, P.C.

(57) ABSTRACT

An image processing apparatus includes a plurality of image processors, and is capable of providing an instruction of any one of a plurality of operation modes including a first recording mode. In the first recording mode, among the plurality of image processors, each image processor other than an image processor in a final stage performs predetermined image processing on image data of a portion that needs to be processed, and outputs image data of a portion other than the portion that needs to be processed to an image processor in a subsequent stage without performing the predetermined image processing thereon. One of the plurality of image processors that is set as a power supply master performs control so as to sequentially bring the plurality of image processors into a power supply state corresponding to the operation mode indicated by the instruction.

11 Claims, 16 Drawing Sheets

(56) References Cited

U.S. PATENT DOCUMENTS

| | | | | |
|---|---|---|---|---|
| 8,924,759 B2* | 12/2014 | Miki | | G06F 1/3231 |
| | | | | 713/323 |
| 9,047,086 B1* | 6/2015 | Liu | | G06F 1/3206 |
| 9,258,475 B2* | 2/2016 | Tachiwa | | H04N 5/23206 |
| 9,288,390 B2* | 3/2016 | Hong | | G06F 1/3287 |
| 9,310,877 B2* | 4/2016 | Yoshida | | G06F 1/3287 |
| 9,674,385 B2* | 6/2017 | Okuda | | H04N 1/00307 |
| 9,674,473 B2* | 6/2017 | Fujihashi | | H04N 5/04 |
| 9,692,967 B1* | 6/2017 | Bamberger | | G02B 27/01 |
| 9,811,147 B2* | 11/2017 | Komatsu | | G06F 1/3265 |
| 9,996,140 B2* | 6/2018 | Ueda | | G06F 1/3287 |
| 10,078,360 B2* | 9/2018 | Yamamizu | | G06F 1/3284 |
| 10,200,586 B2* | 2/2019 | Kiso | | H04N 5/23206 |
| 10,200,608 B1* | 2/2019 | Leizerovich, Jr. | | |
| | | | | H04N 5/23238 |
| 2002/0064384 A1* | 5/2002 | Kawasaki | | G03B 15/05 |
| | | | | 396/157 |
| 2005/0024498 A1* | 2/2005 | Iida | | H04N 1/00278 |
| | | | | 348/207.2 |
| 2006/0007346 A1* | 1/2006 | Nakamura | | H04N 5/2354 |
| | | | | 348/362 |
| 2006/0152612 A1* | 7/2006 | Asada | | H04N 5/23293 |
| | | | | 348/333.01 |
| 2009/0135262 A1* | 5/2009 | Ogasawara | | H04N 5/2354 |
| | | | | 348/211.4 |
| 2009/0185797 A1* | 7/2009 | Ogasawara | | H04N 5/2354 |
| | | | | 396/59 |
| 2010/0149377 A1* | 6/2010 | Shintani | | H04N 5/772 |
| | | | | 348/222.1 |
| 2010/0253821 A1* | 10/2010 | Yamamoto | | H03K 4/02 |
| | | | | 348/294 |
| 2010/0260428 A1* | 10/2010 | Ueno | | H04N 19/80 |
| | | | | 382/232 |
| 2011/0074945 A1* | 3/2011 | Watanabe | | H04N 5/232 |
| | | | | 348/81 |
| 2011/0080507 A1* | 4/2011 | Iwasa | | H04N 5/378 |
| | | | | 348/302 |
| 2011/0099339 A1* | 4/2011 | Hagiwara | | H04N 1/00896 |
| | | | | 711/154 |
| 2011/0234838 A1* | 9/2011 | Naganuma | | G06T 13/80 |
| | | | | 348/222.1 |
| 2011/0296219 A1* | 12/2011 | Okuda | | G03G 15/5004 |
| | | | | 713/323 |
| 2011/0298954 A1* | 12/2011 | Nakaseko | | H04N 5/343 |
| | | | | 348/296 |
| 2012/0120188 A1* | 5/2012 | Arai | | H04N 5/23238 |
| | | | | 348/36 |
| 2013/0073887 A1* | 3/2013 | Miki | | G06F 1/3287 |
| | | | | 713/323 |
| 2013/0198550 A1* | 8/2013 | Yoshida | | G06F 1/24 |
| | | | | 713/324 |
| 2013/0215291 A1* | 8/2013 | Baek | | H04N 19/139 |
| | | | | 348/231.99 |
| 2014/0168494 A1* | 6/2014 | Hong | | G06F 1/1694 |
| | | | | 348/333.01 |
| 2015/0281622 A1* | 10/2015 | Fujihashi | | H04N 5/04 |
| | | | | 348/294 |
| 2015/0379675 A1* | 12/2015 | Yonemoto | | G06T 1/20 |
| | | | | 382/307 |
| 2016/0165087 A1* | 6/2016 | Okuda | | H04N 1/00307 |
| | | | | 358/1.13 |
| 2016/0306413 A1* | 10/2016 | Yamamizu | | H04N 1/00885 |
| 2016/0352959 A1* | 12/2016 | Negishi | | H04N 1/212 |
| 2017/0353648 A1* | 12/2017 | Katagawa | | H04N 5/2355 |
| 2018/0013924 A1* | 1/2018 | Komatsu | | H04N 1/00005 |
| 2018/0024965 A1* | 1/2018 | Suzuki | | G06F 1/32 |
| | | | | 709/213 |

* cited by examiner

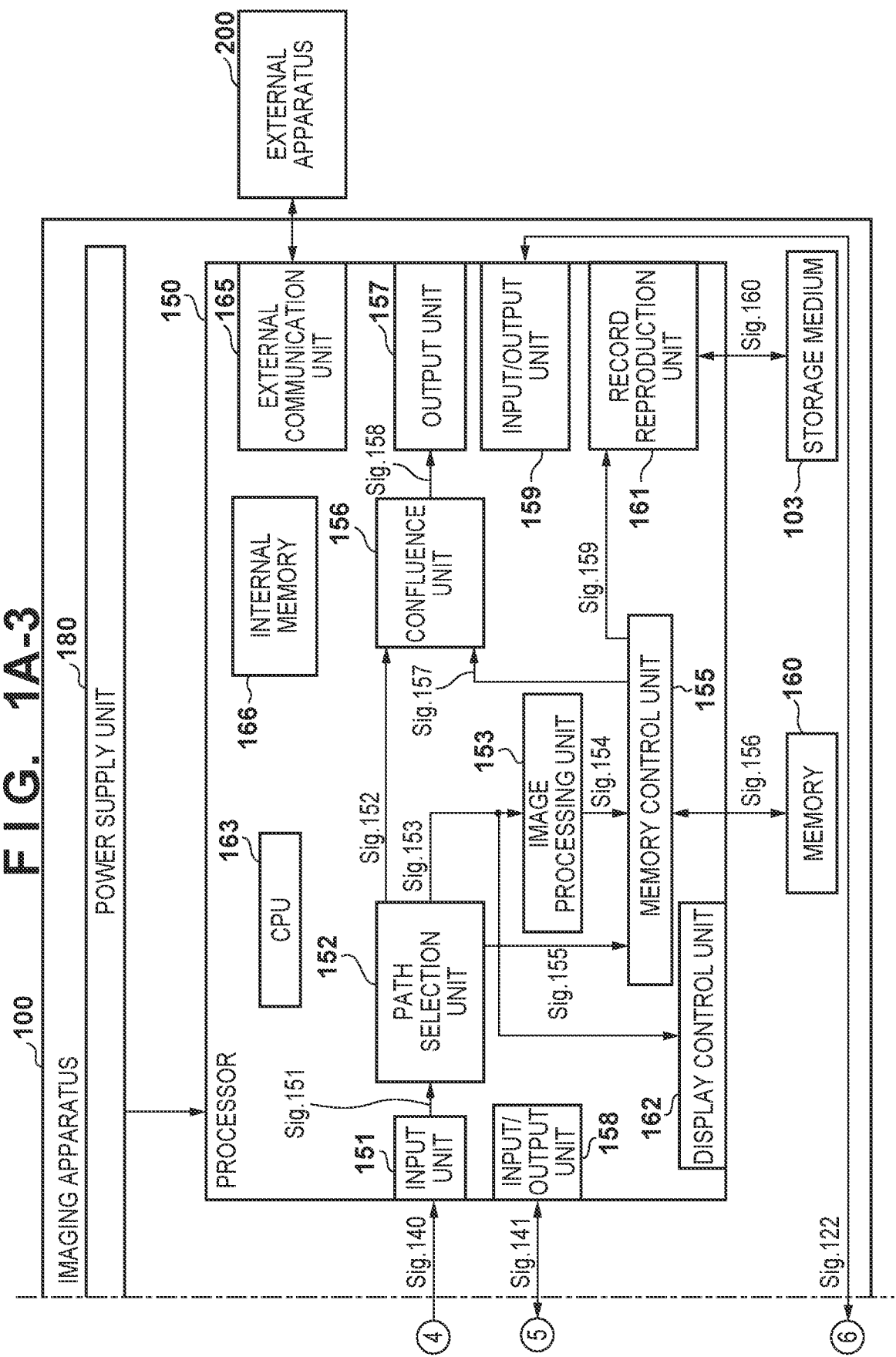

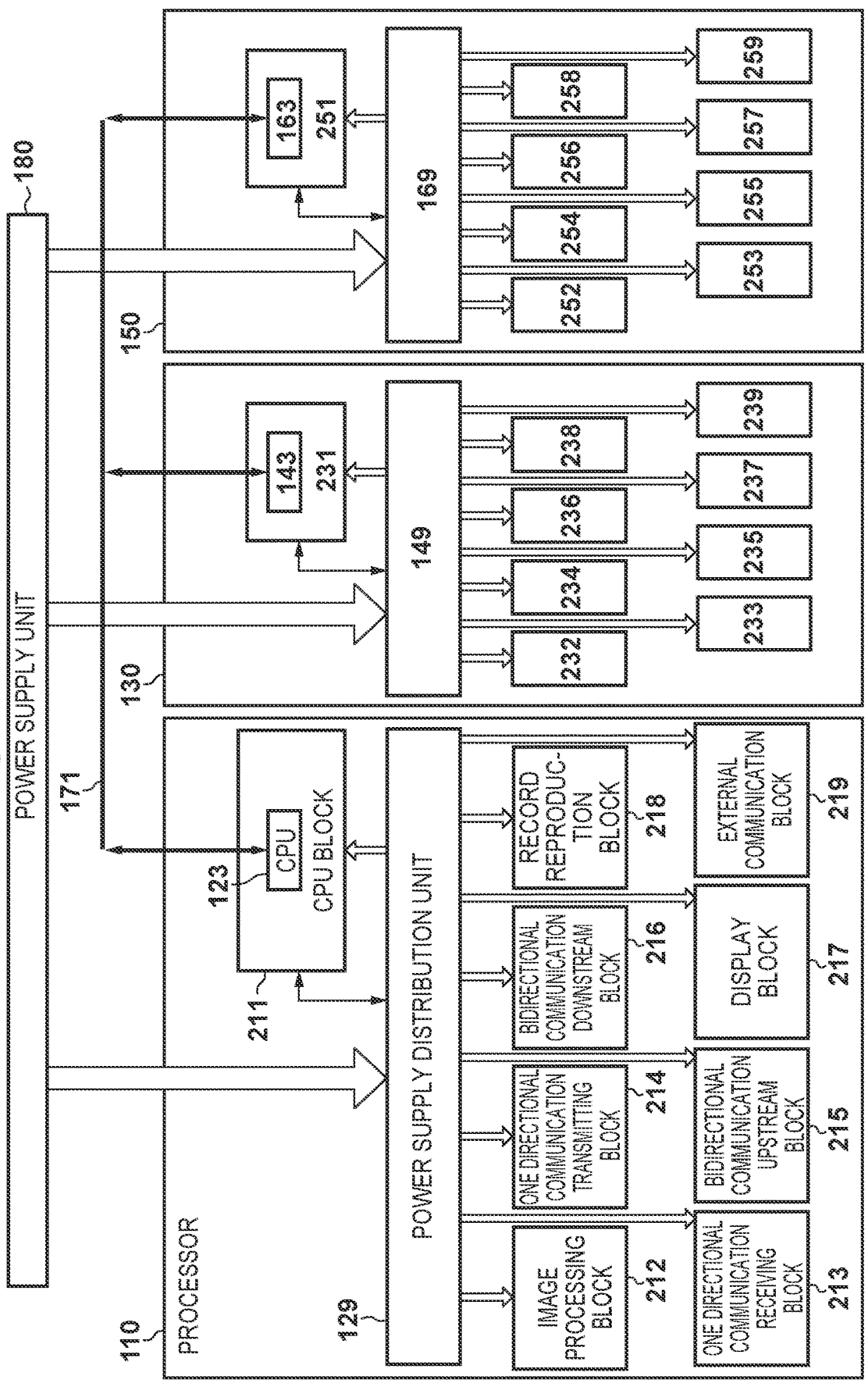

FIG. 2

POWER SUPPLY MASTER MANAGEMENT INFORMATION

| OPERATION MODE | POWER SUPPLY MASTER |
|---|---|
| STANDBY MODE | PROCESSOR 110 |
| STILL IMAGE IMAGING MODE | PROCESSOR 110 |
| MOVING IMAGE IMAGING MODE | PROCESSOR 110 |
| REPRODUCTION MODE | PROCESSOR 110 |
| EXTERNAL CONTROL STANDBY MODE | PROCESSOR 150 |
| EXTERNAL CONTROL STILL IMAGE IMAGING MODE | PROCESSOR 150 |
| EXTERNAL CONTROL MOVING IMAGE IMAGING MODE | PROCESSOR 150 |
| EXTERNAL CONTROL REPRODUCTION MODE | PROCESSOR 150 |

FIG. 3A

| STANDBY MODE | POWER SUPPLY MASTER | CPU | IMAGE PROCESSING BLOCK | ONE DIRECTIONAL COMMUNICATION RECEIVING BLOCK | ONE DIRECTIONAL COMMUNICATION TRANSMITTING BLOCK | BIDIRECTIONAL COMMUNICATION UPSTREAM BLOCK | BIDIRECTIONAL COMMUNICATION DOWNSTREAM BLOCK | DISPLAY BLOCK | RECORD REPRODUCTION BLOCK | EXTERNAL COMMUNICATION BLOCK |
|---|---|---|---|---|---|---|---|---|---|---|
| PROCESSOR 110 | ● | ON | OFF | OFF | OFF | OFF | OFF | OFF | OFF | OFF |
| PROCESSOR 130 | — | OFF | OFF | OFF | OFF | OFF | OFF | OFF | OFF | OFF |
| PROCESSOR 150 | — | OFF | OFF | OFF | OFF | OFF | OFF | OFF | OFF | OFF |

FIG. 3B

| STILL IMAGE IMAGING MODE | POWER SUPPLY MASTER | CPU | IMAGE PROCESSING BLOCK | ONE DIRECTIONAL COMMUNICATION RECEIVING BLOCK | ONE DIRECTIONAL COMMUNICATION TRANSMITTING BLOCK | BIDIRECTIONAL COMMUNICATION UPSTREAM BLOCK | BIDIRECTIONAL COMMUNICATION DOWNSTREAM BLOCK | DISPLAY BLOCK | RECORD REPRODUCTION BLOCK | EXTERNAL COMMUNICATION BLOCK |
|---|---|---|---|---|---|---|---|---|---|---|
| PROCESSOR 110 | ● | ON | ON | ON | ON | ON | ON | ON | OFF | OFF |
| PROCESSOR 130 | — | ON | OFF | ON (ON-FLY SIGNAL ONLY) | ON (ON-FLY SIGNAL ONLY) | ON | ON | OFF | OFF | OFF |
| PROCESSOR 150 | — | ON | OFF | ON | OFF | ON | ON | OFF | ON | OFF |

FIG. 3C

| MOVING IMAGE IMAGING MODE | POWER SUPPLY MASTER | CPU | IMAGE PROCESSING BLOCK | ONE DIRECTIONAL COMMUNICATION RECEIVING BLOCK | BIDIRECTIONAL COMMUNICATION DOWNSTREAM BLOCK | BIDIRECTIONAL COMMUNICATION UPSTREAM BLOCK | ONE DIRECTIONAL COMMUNICATION TRANSMITTING BLOCK | DISPLAY BLOCK | RECORD REPRODUCTION BLOCK | EXTERNAL COMMUNICATION BLOCK |
|---|---|---|---|---|---|---|---|---|---|---|
| PROCESSOR 110 | ● | ON | ON | ON | ON | ON | ON | ON | OFF | OFF |
| PROCESSOR 130 | — | ON | ON | ON | ON | ON | ON | OFF | OFF | OFF |
| PROCESSOR 150 | — | ON | ON | ON | ON | ON | OFF | OFF | ON | OFF |

FIG. 3D

| REPRODUCTION MODE | POWER SUPPLY MASTER | CPU | IMAGE PROCESSING BLOCK | ONE DIRECTIONAL COMMUNICATION RECEIVING BLOCK | ONE DIRECTIONAL COMMUNICATION TRANSMITTING BLOCK | BIDIRECTIONAL COMMUNICATION UPSTREAM BLOCK | BIDIRECTIONAL COMMUNICATION DOWNSTREAM BLOCK | DISPLAY BLOCK | RECORD REPRODUCTION BLOCK | EXTERNAL COMMUNICATION BLOCK |
|---|---|---|---|---|---|---|---|---|---|---|
| PROCESSOR 110 | ● | ON | OFF | OFF | OFF | ON | OFF | ON | OFF | OFF |
| PROCESSOR 130 | — | OFF | OFF | OFF | OFF | OFF | OFF | OFF | OFF | OFF |
| PROCESSOR 150 | — | ON | OFF | OFF | OFF | OFF | ON | OFF | ON | OFF |

F I G. 4A

| EXTERNAL CONTROL STANDBY MODE | POWER SUPPLY MASTER | CPU | IMAGE PROCESSING BLOCK | ONE DIRECTIONAL COMMUNICATION RECEIVING BLOCK |
|---|---|---|---|---|
| PROCESSOR 110 | — | OFF | OFF | OFF |
| PROCESSOR 130 | — | OFF | OFF | OFF |
| PROCESSOR 150 | ● | ON | OFF | OFF |

| ONE DIRECTIONAL COMMUNICATION TRANSMITTING BLOCK | BIDIRECTIONAL COMMUNICATION UPSTREAM BLOCK | BIDIRECTIONAL COMMUNICATION DOWNSTREAM BLOCK | DISPLAY BLOCK | RECORD REPRODUCTION BLOCK | EXTERNAL COMMUNICATION BLOCK |
|---|---|---|---|---|---|
| OFF | OFF | OFF | OFF | OFF | OFF |
| OFF | OFF | OFF | OFF | OFF | OFF |
| OFF | OFF | OFF | OFF | OFF | ON |

FIG. 4B

EXTERNAL CONTROL STILL IMAGE IMAGING MODE

| | POWER SUPPLY MASTER | CPU | IMAGE PROCESSING BLOCK | ONE DIRECTIONAL COMMUNICATION RECEIVING BLOCK |
|---|---|---|---|---|
| PROCESSOR 110 | — | ON | ON | ON |
| PROCESSOR 130 | — | ON | OFF | ON (ON-FLY SIGNAL ONLY) |
| PROCESSOR 150 | ● | ON | OFF | ON |

| ONE DIRECTIONAL COMMUNICATION TRANSMITTING BLOCK | BIDIRECTIONAL COMMUNICATION UPSTREAM BLOCK | BIDIRECTIONAL COMMUNICATION DOWNSTREAM BLOCK | DISPLAY BLOCK | RECORD REPRODUCTION BLOCK | EXTERNAL COMMUNICATION BLOCK |
|---|---|---|---|---|---|
| ON | ON | ON | ON | OFF | OFF |
| ON (ON-FLY SIGNAL ONLY) | ON | ON | OFF | OFF | OFF |
| OFF | ON | ON | OFF | ON | ON |

FIG. 4C

| External Control Moving Image Imaging Mode | Power Supply Master | CPU | Image Processing Block | One Directional Communication Receiving Block | One Directional Communication Transmitting Block | Bidirectional Communication Upstream Block | Bidirectional Communication Downstream Block | Display Block | Record Reproduction Block | External Communication Block |
|---|---|---|---|---|---|---|---|---|---|---|
| PROCESSOR 110 | — | ON | ON | ON | ON | ON | ON | ON | OFF | OFF |
| PROCESSOR 130 | — | ON | ON | ON | ON | ON | ON | OFF | OFF | OFF |
| PROCESSOR 150 | ● | ON | ON | ON | OFF | ON | ON | OFF | ON | ON |

FIG. 4D

| EXTERNAL CONTROL REPRODUCTION MODE | POWER SUPPLY MASTER | CPU | IMAGE PROCESSING BLOCK | ONE DIRECTIONAL COMMUNICATION RECEIVING BLOCK |
|---|---|---|---|---|
| PROCESSOR 110 | — | ON | OFF | OFF |
| PROCESSOR 130 | — | OFF | OFF | OFF |
| PROCESSOR 150 | ● | ON | OFF | OFF |

| ONE DIRECTIONAL COMMUNICATION TRANSMITTING BLOCK | BIDIRECTIONAL COMMUNICATION UPSTREAM BLOCK | BIDIRECTIONAL COMMUNICATION DOWNSTREAM BLOCK | DISPLAY BLOCK | RECORD REPRODUCTION BLOCK | EXTERNAL COMMUNICATION BLOCK |
|---|---|---|---|---|---|
| OFF | ON | OFF | ON | OFF | OFF |
| OFF | OFF | OFF | OFF | OFF | OFF |
| OFF | OFF | ON | OFF | ON | ON |

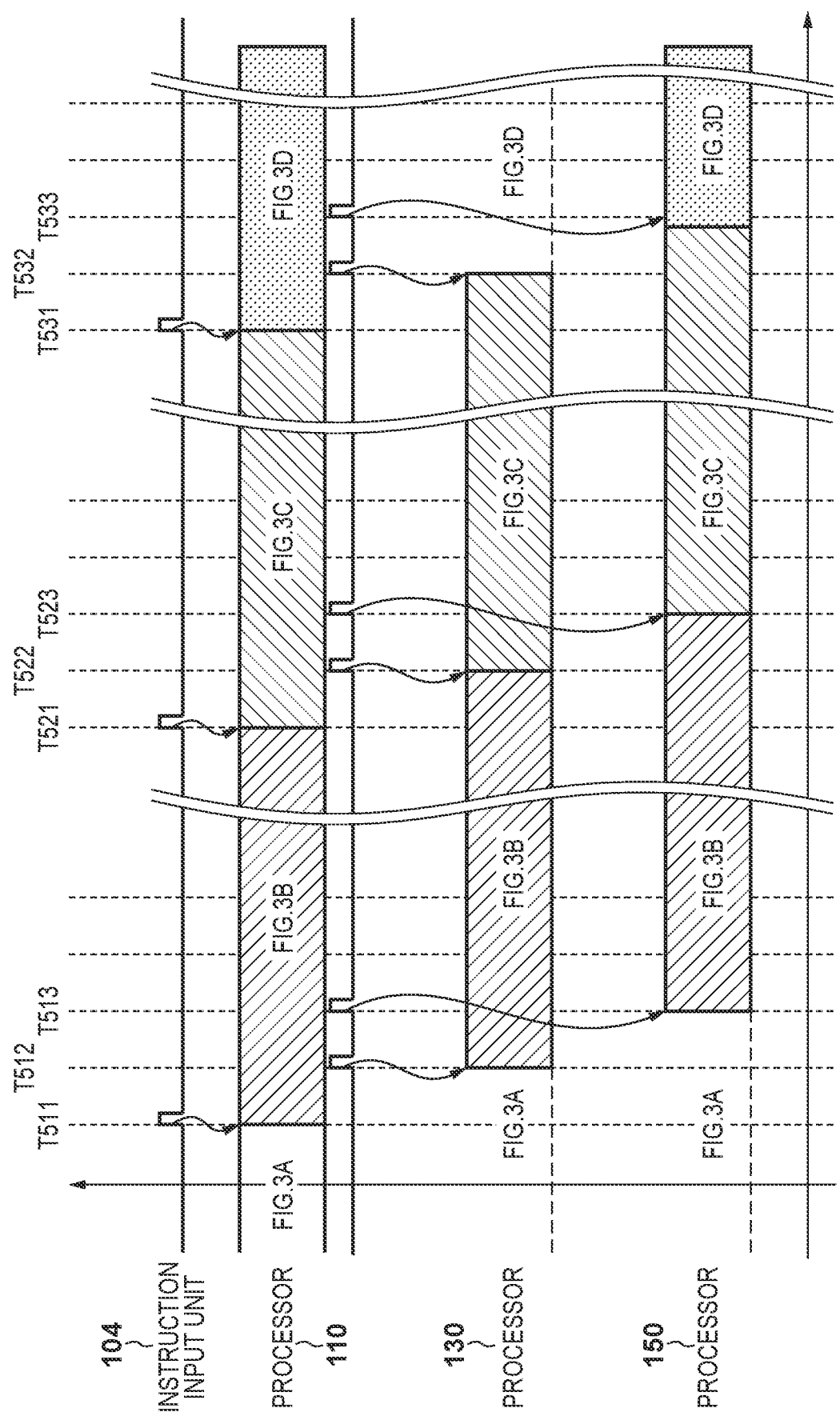

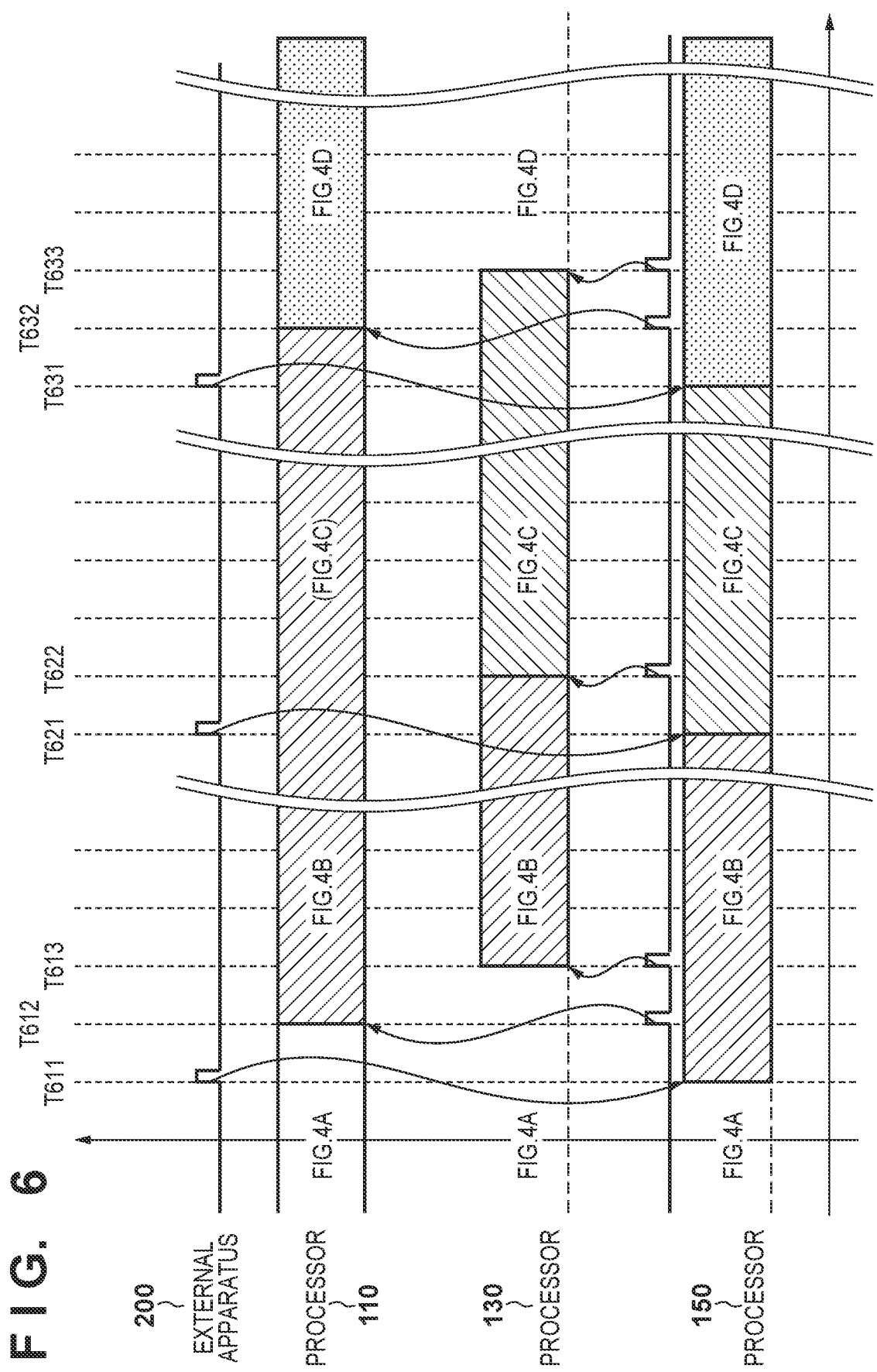

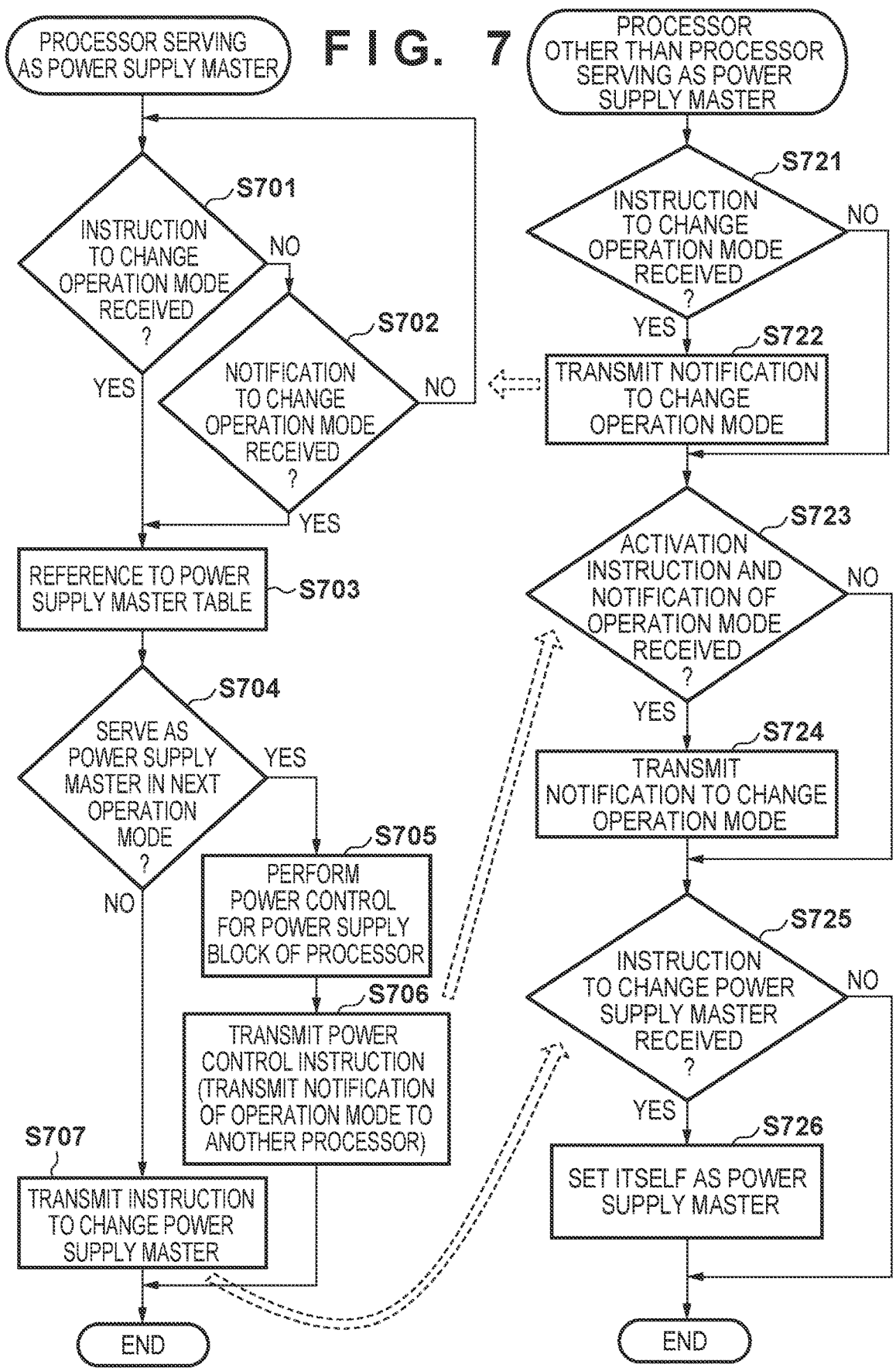

IMAGE PROCESSING APPARATUS

BACKGROUND OF THE INVENTION

Field of the Invention

The present invention relates to an image processing apparatus including a plurality of processors.

Description of the Related Art

The amount of data processed by a processor in an imaging apparatus (for example, a digital camera) is increasing as the number of pixels in an image sensor and the frame rate of a moving image increase. An increase in the amount of data processed by a single processor may make impossible for the processor to process the data. In order to avoid such a situation, a configuration is known in which a plurality of processors are mounted such that processing is shared by the plurality of processors. Japanese Patent Laid-Open No. 2013-003986 (hereinafter referred to as Document 1) and Japanese Patent Laid-Open No. 2014-216668 (hereinafter referred to as Document 2) disclose a configuration in which regions obtained by dividing an image are allocated to and processed by a plurality of serially connected processors.

Documents 1 and 2 disclose that processing is performed by using a plurality of processors, but they do not disclose power control for the plurality of processors. In general, power consumption increases when a plurality of processors are used, but a portable imaging apparatus such as a digital camera is required to have low power consumption in order to reduce the wear of the battery. In addition, if control is performed so as to simultaneously provide supply of power to the plurality of processors, a large inrush current flows. In order to address such an inrush current, a large amount of power supply and an increase in the components cost are required, which are problems to be solved.

SUMMARY OF THE INVENTION

According to an embodiment of the present invention, a reduction in power consumption in an imaging apparatus including a plurality of processors is achieved.

According to one aspect of the present invention, there is provided an image processing apparatus comprising: an imaging unit; a plurality of serially connected image processors, wherein one of the plurality of image processors that is in a first stage is connected to the imaging unit; a recording unit that records image data processed by the plurality of image processors in a storage medium; and a mode instruction unit that provides an instruction of one of a plurality of operation modes including a first recording mode in which each of the plurality of image processors performs predetermined image processing on a portion of image data output from the imaging unit, wherein in the first recording mode, an image processor other than an image processor in a final stage among the plurality of image processors performs the predetermined image processing on image data of a portion that needs to be processed by the image processor, and outputs image data of a portion other than the portion that needs to be processed by the image processor to an image processor in a subsequent stage without performing the predetermined image processing thereon; and a power supply unit that supplies power to the plurality of image processors, wherein the plurality of image processors each include a plurality of function blocks, and individually control a power supply state of the plurality of function blocks, one of the plurality of image processors is set as a power supply master, and the image processor that has been set as the power supply master performs control so as to sequentially bring the plurality of image processors into the power supply state corresponding to the operation mode indicated by the mode instruction unit.

Further features of the present invention will become apparent from the following description of exemplary embodiments (with reference to the attached drawings).

BRIEF DESCRIPTION OF THE DRAWINGS

FIG. 1A-1, FIG. 1A-2 and FIG. 1A-3 are block diagrams showing a plurality of constituent elements of an imaging apparatus 100 according to Embodiment 1.

FIG. 1B is a block diagram illustrating a configuration of power supply in the imaging apparatus 100.

FIG. 2 is a diagram illustrating an example of power supply master management information.

FIGS. 3A to 3D are diagrams illustrating a plurality of operation modes (in the case where control is made from an instruction input unit 104).

FIGS. 4A to 4D are diagrams illustrating a plurality of operation modes (in the case where control is made from an external apparatus 200).

FIG. 5 is a diagram showing an example of a timing chart (in the case where control is made from the instruction input unit 104).

FIG. 6 is a diagram showing an example of a timing chart (in the case where control is made from the external apparatus 200).

FIG. 7 is a flowchart illustrating changing power supply master and a flow of power control.

DESCRIPTION OF THE EMBODIMENTS

Figures 1, 1A:
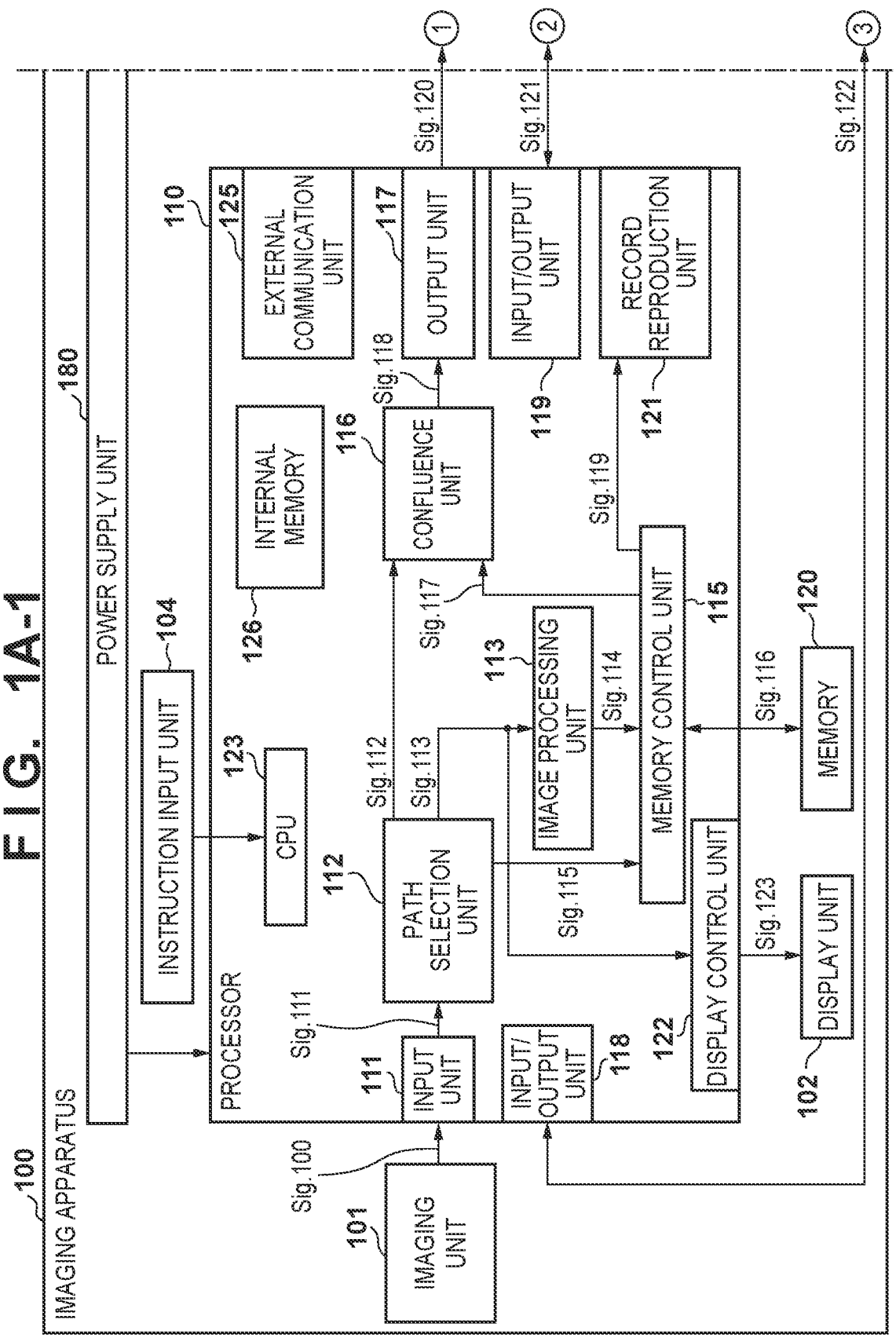

Hereinafter, an embodiment according to the present invention will be described with reference to the drawings. Note, however, that the present invention is not limited to the embodiment given below.

Embodiment 1

FIGS. 1A-1 to 1A-3 are block diagrams showing a plurality of constituent elements of an imaging apparatus 100 of Embodiment 1 as an image processing apparatus according to the present invention. The imaging apparatus 100 includes an imaging unit 101, three image processors (processors 110, 130 and 150), three memories 120, 140 and 160, a power supply unit 180, a display unit 102, a storage medium 103, and an instruction input unit 104. The imaging unit 101 is connected to an input unit 111 of the processor 110, and outputs a captured image to the processor 110 as an image signal (Sig 100). The processors 110, 130 and 150 are configured as single-chip semiconductor integrated circuits. The memories 120, 140 and 160 are configured as single-chip integrated circuits that are different from the processors 110, 130 and 150.

The processor 110, the processor 130, and the processor 150 are serially connected in cascade. The processor 110 is positioned in the first stage of the cascade connection, and the processor 150 is positioned in the final stage of the cascade connection. The imaging unit 101 is connected to the processor 110 positioned in the first stage. The number of processors that are connected in cascade is not limited to three, and may be any number equal to or greater than two.

The processor 110 and the processor 130 are connected with a one directional communication connection (Sig 120) and with a bidirectional communication connection (Sig 121). The processor 110 and the processor 150 are connected with a bidirectional communication connection (Sig 122). The processor 130 and the processor 150 are connected with a one directional communication connection (Sig 140) and with a bidirectional communication connection (Sig 141).

The memory 120 is connected to the processor 110 so as to be capable of bidirectional communication (memory IF signal (Sig 116)). The memory 140 is connected to the processor 110 so as to be capable of bidirectional communication (memory IF signal (Sig 136)). The memory 160 is connected to the processor 110 so as to be capable of bidirectional communication (memory IF signal (Sig 156)).

The power supply unit 180 supplies power to the processor 110, the processor 130, the processor 150, and the like. The power supply unit 180 may be provided for each processor or may be a common power supply unit. An external apparatus 200 is, for example, a PC, and is connected to the processor 150 (external communication unit 165). The external apparatus 200 connected to the imaging apparatus 100 can perform control so as to, for example, switch the operation mode of the imaging apparatus 100. The external apparatus 200 need not be connected if it is unnecessary to perform control from the external apparatus 200.

The display unit 102 is, for example, a liquid crystal display, and displays a verification image in an imaging mode or a reproduced image in a reproduction mode. In the imaging apparatus 100, the display unit 102 is connected to the processor 110. The storage medium 103 is a portable memory that can be attached to and detached from the imaging apparatus 100, and is used to, for example, record image data captured by the imaging unit 101. In the imaging apparatus 100, the storage medium 103 is connected to the processor 150 positioned in the final stage of the cascade connection. The instruction input unit 104 includes switches and the like (for example, a shutter button, a mode dial, and a zoom lever) for the user to input an instruction to the imaging apparatus 100. The instruction input unit 104 may be configured by a touch panel, or may be configured to include a touch panel. In the imaging apparatus 100, the instruction input unit 104 is connected to the processor 110.

Next, the processors 110, 130 and 150 will be described in detail. In Embodiment 1, the processors 110, 130 and 150 are devices having the same configuration, and dynamically change their functions depending on the operation mode of the imaging apparatus 100. A configuration of the processor 110 will be described first.

In the example shown in FIGS. 1A-1 to 1A-3, the processor 110 includes an input unit 111, a path selection unit 112, a confluence unit 116, an output unit 117, an image processing unit 113, a memory control unit 115, an input/output unit 118, an input/output unit 119, a record reproduction unit 121, a display control unit 122, a CPU 123, an external communication unit 125, and an internal memory 126.

The input unit 111 receives an input of an image signal (Sig 100) output from the imaging unit 101, and outputs an image signal (Sig 111) to the path selection unit 112. The path selection unit 112 outputs the image signal (Sig 111) from the input unit 111 to any one or more of the following units: (1) the confluence unit 116; (2) image processing unit 113 and the display control unit 122; and (3) the memory control unit 115. A signal (Sig 112) output from the path selection unit 112 to the confluence unit 116 is used as an on-fly signal. The on-fly signal refers to a signal that is received by the processors 110 and 130 other than the processor 150 in the final stage from the processor 110 in a preceding stage or from the imaging unit 101 and is output to a processor in the next stage without being temporarily stored in the memory 120 or 140 connected to the processor. A signal (Sig 113) output from the path selection unit 112 to the image processing unit 113 and the display control unit 122 is used as an image processing signal. A signal (Sig 115) output from the path selection unit 112 to the memory control unit 115 is used as a memory writing signal.

The image processing unit 113 performs predetermined image processing on the image processing signal (Sig 113) input from the path selection unit 112, and outputs an image processed signal (Sig 114) to the memory control unit 115. The image processing executed by the image processing unit 113 includes, for example, various types of conversion processing operations (color conversion processing, and the like), data encoding processing, data decoding processing, and the like. The memory control unit 115 receives a request from each constituent element, and performs writing and reading of various types of signals (for example, the image processed signal) with respect to the memory 120 via the memory IF signal (Sig 116). The memory control unit 115 writes the memory writing signal input from the path selection unit 112 into the memory 120.

The confluence unit 116 outputs a confluence signal (Sig 118) to the output unit 117, the confluence signal (Sig 118) being a signal in which the on-fly signal (Sig 112) input from the path selection unit 112 and a memory readout signal (Sig 117) read out from the memory 120 via the memory control unit 115 are merged together. The confluence unit 116 gives higher priority to the on-fly signal (Sig 112) in the convergence of the signal. For example, the confluence unit 116 issues a readout request to the memory control unit 115 and outputs the memory readout signal (Sig 117) to the processor 130 in the next stage during a period in which there is no input of the on-fly signal (Sig 112) from the path selection unit 112.

The output unit 117 performs one directional communication with the processor 130 (input unit 131) in the next stage. The output unit 117 transmits, for example, the confluence signal (Sig 118) input from the confluence unit 116 to the processor 130 as an image signal (Sig 120). The input/output unit 118 and the input/output unit 119 perform bidirectional communication with the processor in the preceding stage and the processor in the next stage, respectively. In Embodiment 1, there is no processor in the preceding stage prior to the processor 110. Instead, the input/output unit 118 is connected to an input/output unit 159 of the processor 150 in the final stage, and performs transmission and reception of a bidirectional communication signal (Sig 122). The input/output unit 119 is connected to an input/output unit 138 of the processor 130 in the next stage, and performs transmission and reception of a bidirectional communication signal (Sig 121). The information transmitted and received by the input/output unit 118 and the input/output unit 119 as bidirectional communication signals includes correction values for image processing used in other processors and information on flow control between processors.

The record reproduction unit 121 performs image recording into a storage medium as well as image reading from the storage medium and reproduction of images. In Embodiment 1, no storage medium is connected to the processor 110, and thus the record reproduction unit 121 is unconnected. The display control unit 122 receives an input of the image processing signal (Sig 113), and generates and outputs a display image to be displayed on a liquid crystal panel. In Embodiment 1, the display unit 102 is connected to the display control unit 122, and the display control unit 122 generates a display image from the image processing signal (Sig 113) and outputs the display image to the display unit 102. The display unit 102 displays the display image input from the display control unit 122.

The CPU 123 executes a program for running the processor 110. The program is stored in, for example, the internal memory 126 of the processor 110. The external communication unit 125 implements communication with an external apparatus such as, for example, a PC. In Embodiment 1, the external communication unit 125 of the processor 110 is unconnected. The internal memory 126 stores therein power supply master management information in addition to the program executed by the CPU 123. The power supply master management information refers to management information indicative of a processor that serves as the power supply master in each operation mode of the imaging apparatus 100. The power supply master management information will be described later with reference to FIG. 2.

The output units 117, 137 and 157 respectively provided in the processors 110, 130 and 150 are capable of outputting electrical characteristics similar to those of an output unit of the imaging unit 101. Accordingly, the input unit 111 that receives an output from the imaging unit 101, and input units 131 and 151 that receive an output from the processor in the preceding stage can be configured to have a common structure. For example, the electrical characteristics of the physical layers and LSI terminals in the input units 111, 131 and 151 can be made common.

Next, a configuration of the processor 130 will be described. In the example shown in FIGS. 1A-1 to 1A-3, the processor 130 includes an input unit 131, a path selection unit 132, a confluence unit 136, an output unit 137, an image processing unit 133, a memory control unit 135, an input/output unit 138, an input/output unit 139, a record reproduction unit 141, a display control unit 142, a CPU 143, an external communication unit 145, and an internal memory 146. The constituent elements of the processor 130 mentioned above have the same functions as the corresponding constituent elements of the processor 110.

In the processor 130, the record reproduction unit 141, the display control unit 142, and the external communication unit 145 are unconnected. The input unit 131 outputs the image signal (Sig 120) input from the output unit 117 of the processor 110 to the path selection unit 132 (Sig 131). The output unit 137 performs one directional communication with the processor 150 in the next stage. The output unit 137 transmits a confluence signal (Sig 138) input from the confluence unit 136 to the processor 150 in the next stage as an image signal (Sig 140). The input/output unit 138 performs bidirectional communication with the input/output unit 119 of the processor 110 in the preceding stage (performs transmission and reception of the bidirectional communication signal (Sig 121)). The input/output unit 139 performs bidirectional communication with an input/output unit 158 of the processor 150 in the next stage. Transmission and reception of a bidirectional signal (Sig 141) is thereby performed. The CPU 143 executes a program for running the processor 130 (the program being stored, for example, in the internal memory 146).

Next, a configuration of the processor 150 will be described. In the example shown in FIGS. 1A-1 to 1A-3, the processor 150 includes an input unit 151, a path selection unit 152, a confluence unit 156, an output unit 157, an image processing unit 153, a memory control unit 155, an input/output unit 158, an input/output unit 159, a record reproduction unit 161, a display control unit 162, a CPU 163, an external communication unit 165, and an internal memory 166. The constituent elements of the processor 150 have the same functions as the corresponding constituent elements of the processor 110 and the processor 130.

The input unit 151 receives an input of the image signal (Sig 140) output from the output unit 137 of the processor 130 in the preceding stage and outputs the image signal (image signal (Sig 151)) to the path selection unit 152. In Embodiment 1, the processor 150 is a processor positioned in the final stage of the cascade connection, and thus there is no processor in the next stage. For this reason, the output unit 157 is unconnected. The input/output unit 158 performs bidirectional communication with the input/output unit 139 of the processor 130 in the preceding stage. Transmission and reception of the bidirectional signal (Sig 141) is thereby performed. The input/output unit 159 performs bidirectional communication with the input/output unit 118 of the processor 110 in the first stage. Transmission and reception of the bidirectional communication signal (Sig 122) is thereby performed. The processor 150 is connected to the storage medium 103, and the record reproduction unit 161 performs image recording into the storage medium 103, image readout from the storage medium 103, and reproduction of images. The CPU 163 executes a program for running the processor 150 (the program being stored, for example, in the internal memory 166). The external communication unit 165 of the processor 150 is connected to the external apparatus 200. The record reproduction unit 161 is connected to the storage medium 103.

Figures 1, 1A, 2:
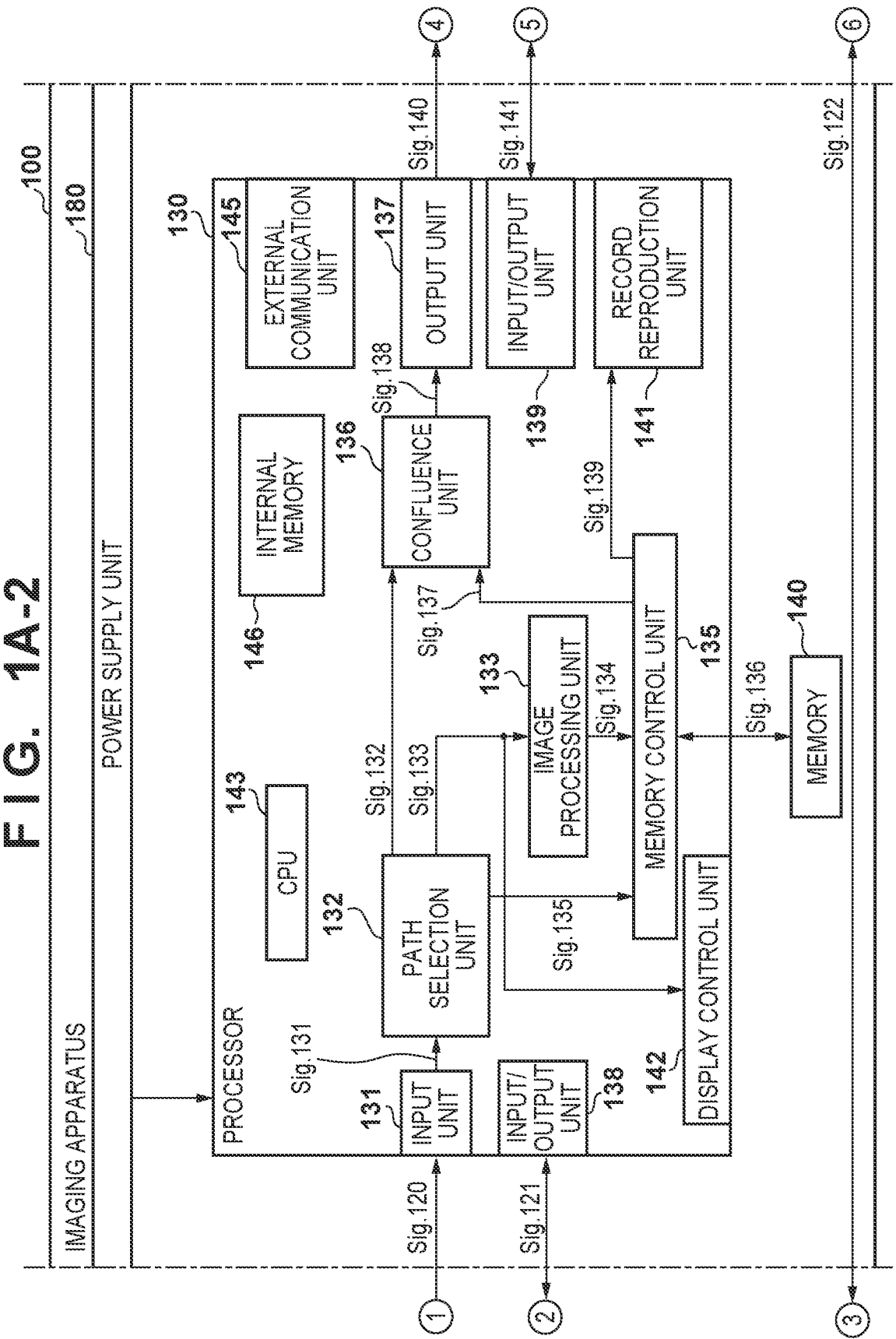

FIG. 2 is a diagram illustrating an example of power supply master management information stored in the internal memory 126, the internal memory 146, and the internal memory 166. As used herein, "power supply master" refers to a processor having a function of providing an instruction to control power to each processor and the functional blocks of each processor in each operation mode of the imaging apparatus 100.

In Embodiment 1, the imaging apparatus 100 has a plurality of executable operation modes. To be specific, the imaging apparatus 100 has four operation modes: a standby mode, a still image imaging mode, a moving image imaging mode, and a reproduction mode. A mode instruction for instructing any of these plural operation modes is made from the instruction input unit 104 or the external apparatus 200. Furthermore, each of the four modes includes two modes: a mode in which an input of an instruction is received from the instruction input unit 104; and a mode in which an input of an instruction is received from the external apparatus 200 such as a PC, and therefore the imaging apparatus 100 has eight operation modes in total. Of course, the type of operation modes is not limited thereto. Hereinafter, the operation modes operated in response to an instruction from the instruction input unit 104 will be referred to as "standby mode", "still image imaging mode", "moving image imaging mode", and "reproduction mode". Likewise, the operation modes operated in response to an instruction from the external apparatus 200 will be referred to as "external control standby mode", "external control still image imaging mode", "external control moving image imaging mode", and "external control reproduction mode".

In the still image imaging mode, upon receiving an instruction to record a still image from the instruction input unit 104, the CPU 123 of the processor 110 controls the input unit 111 so as to receive an input of one screen's worth of still image data from the imaging unit 101. The CPU 123 controls the path selection unit 112 so as to transmit the input one screen's worth of still image data to the image processing unit 113. The image processing unit 113 performs processing on the input still image data, and outputs the processed still image data to the memory control unit 115. The image processing unit 113 also temporarily stores the still image data in the memory 120 via the memory control unit 115 so as to perform image processing. Upon completion of the processing performed by the image processing unit 113, the CPU 123 controls the confluence unit 116 so as to read out the still image data that has been processed by the image processing unit 113 and stored in the memory 120, and outputs the still image data to the output unit 117. The output unit 117 transmits the processed still image data to the processor 130.

In the still image imaging mode, the processor 130 outputs the still image data that has been processed by the processor 110 to the processor 150 without performing predetermined processing on the still image data. Accordingly, the CPU 143 controls the path selection unit 132 so as to output the still image data that has been processed by the processor 110 and input from the input unit 131 to the confluence unit 136, and output the still image data to the output unit 137 from the confluence unit 136 without performing any processing. That is, the still image data that has been processed by the processor 110 is output to the confluence unit 136 without being stored in the memory 140. The output unit 137 outputs the still image data from the confluence unit 136 to the input unit 151 of the processor 150.

In the still image imaging mode, the processor 150 receives the still image data processed by the processor 110 via the processor 130 in the manner as described above. The CPU 163 controls the path selection unit 152 so as to output the input still image data to the memory control unit 155 and temporarily store the still image data in the memory 160. Then, the CPU 163 controls the record reproduction unit 161 so as to read out the still image data from the memory 160 at a predetermined timing and record the still image data in the storage medium 103.

On the other hand, in the moving image imaging mode, a portion of each frame of moving image data output from the imaging unit 101 is processed by the processors 110, 130 and 150.

In the moving image imaging mode, upon receiving an instruction to start recording a moving image from the instruction input unit 104, the CPU 123 of the processor 110 controls the input unit 111 so as to receive an input of moving image data from the imaging unit 101. The CPU 123 controls the path selection unit 112 so as to transmit the data of a portion of each frame of the input moving image data that is to be processed by the processor 110 to the image processing unit 113 and output the remaining to the confluence unit 116.

In the present embodiment, in each frame of the moving image data, a vertically lower portion is processed by the processor 110, an upper portion of the frame is processed by the processor 150, and a center portion is processed by the processor 130. The lower portion that is processed by the processor 110 and the center portion that is processed by the processor 130 are allocated so as to overlap with each other at their boundary portion. Likewise, the upper portion that is processed by the processor 150 and the center portion that is processed by the processor 130 are allocated so as to overlap with each other at their boundary portion.

The image processing unit 113 performs processing on the input moving image data, and outputs the processed moving image data to the memory control unit 115. Also, the image processing unit 113 temporarily stores the moving image data in the memory 120 via the memory control unit 115 so as to perform image processing. Upon completion of the processing performed by the image processing unit 113, the CPU 123 controls the confluence unit 116 so as to read out the moving image data that has been processed by the image processing unit 113 and stored in the memory 120, and output the moving image data to the output unit 117. As described above, the output unit 117 transmits the moving image data that has been processed by the processor 110 to the processor 130 during a period in which on-fly data to be sent to the processors 130 and 150 in the subsequent stages is not transmitted.

In the moving image imaging mode, the processor 130 outputs moving image data of a region to be processed by the processor 150 and the moving image data that has been processed by the processor 110 to the processor 150, without performing image processing on these moving image data. Accordingly, the CPU 143 controls the path selection unit 132 so as to output, to the confluence unit 136, the moving image data of an upper region to be processed by the processor 150 and the moving image data that has been processed by the processor 110, which were input from the input unit 131, and then output these moving image data to the output unit 137 from the confluence unit 136 without performing any processing. The output unit 137 outputs, to the input unit 151 of the processor 150, the moving image data of an upper region to be processed by the processor 150 and the moving image data that has been processed by the processor 110. The CPU 143 controls the path selection unit 132 so as to extract data of a region to be processed by the processor 130 from the moving image data input from the input unit 131, and transmit the extracted data to the image processing unit 133.

The image processing unit 133 performs processing on the input moving image data, and outputs the processed moving image data to the memory control unit 135. Also, the image processing unit 133 temporarily stores the moving image data in the memory 140 via the memory control unit 135 so as to perform image processing. Upon completion of the processing performed by the image processing unit 133, the CPU 143 controls the confluence unit 136 so as to read out the moving image data that has been processed by the image processing unit 133 and stored in the memory 140, and output the moving image data to the output unit 137. As described above, the output unit 137 transmits the moving image data that has been processed by the processor 130 to the processor 150 during a period in which on-fly data to be sent to the processor 150 in the subsequent stage is not transmitted.

In the moving image imaging mode, the processor 150 receives, via the processor 130, the data of an upper portion of each frame and the moving image data that has been processed by the processors 110 and 130. The CPU 163 controls the path selection unit 152 so as to transmit the moving image data to be processed by the processor 150 to the image processing unit 153, and output the moving image data that has been processed by the processors 110 and 130 to the memory control unit 155 so as to temporarily store these data in the memory 160.

The image processing unit 153 performs processing on the input moving image data, and outputs the processed moving image data to the memory control unit 155. The image processing unit 153 temporarily stores the moving image data in the memory 160 via the memory control unit 155 so as to perform image processing. Through this, the image-processed moving image data of each frame is stored in the memory 160. The CPU 163 controls the record reproduction unit 161 so as to read out the moving image data of each frame from the memory 160 at a predetermined timing, and record the moving image data in the storage medium 103.

As described above, in the moving image imaging mode, moving image data are allocated to and processed by the processors. Also, upon receiving an instruction to stop recording the moving image from the instruction input unit 104, the CPU 123 provides an instruction to stop recording the moving image to the processors, and ends the recording.

Next, in the reproduction mode, upon receiving a reproduction instruction from the instruction input unit 104, the CPU 123 transmits an image reproduction instruction to the processor 150 from the input/output unit 118. For example, upon receiving an instruction to reproduce still image data from the instruction input unit 104, the CPU 123 transmits, to the processor 150, an instruction to reproduce designated still image data from among the still images recorded in the storage medium 103. Also, upon receiving an instruction to reproduce moving image data from the instruction input unit 104, the CPU 123 transmits, to the processor 150, an instruction to reproduce designated moving image data from among the moving images recorded in the storage medium 103.

In the processor 150, the CPU 163 controls the record reproduction unit 161 so as to reproduce the still image data or the moving image data, for which a reproduction instruction has been issued, from the storage medium 103 and temporarily store the image data in the memory 160 via the memory control unit 155. Then, the CPU 163 controls the image processing unit 153 so as to process the still image data or the moving image data stored in the memory 160 and again store the image data in the memory 160. Then, the CPU 163 reads out the still image data or the moving image data that has undergone reproduction processing from the memory 160, and transmits the image data to the processor 110 from the input/output unit 159.

The processor 110 receives, at the input/output unit 118, an input of the still image data or the moving image data transmitted from the processor 150, and transmits the image data to the display control unit 122. The display control unit 122 displays the input still image or moving image on the display unit 102.

Upon receiving an instruction to stop the reproduction from the instruction input unit 104, the CPU 123 transmits an instruction to stop the reproduction to the processor 150 from the input/output unit 118. In response to the instruction to stop the reproduction, the CPU 163 of the processor 150 stops the reproduction of image by the record reproduction unit 161.

As shown in FIG. 2, in the case where the imaging apparatus 100 is controlled from the instruction input unit 104, the processor 110 connected to the instruction input unit 104 serves as the power supply master. On the other hand, in the case where the imaging apparatus 100 is controlled from the external apparatus 200, the processor 150 connected to the external apparatus 200 serves as the power supply master. In this way, the processor serving as the power supply master is switched to a processor that is connected to the device that outputs a control instruction, and thereby power saving is achieved. This is because, for example, in the external control standby mode, while the CPU 163 of the processor 150 is in a normal operation state, the other processors 110 and 130 are brought into a power save state, which will be described later with reference to FIGS. 4A to 4D.

In contrast, a case will be considered in which the processor 110 is fixedly set as the power supply master irrespective of the imaging mode. In this case, for example, in the external control standby mode, it is necessary to provide power supply so as to bring both the processor 110 that serves as the power supply master and the processor 150 that is waiting for a control instruction from the external apparatus 200 into a normal operation state. For this reason, the power consumption during the standby mode (while waiting) increases as compared to the case where the processor 150 serves as the power supply master as described above. As a result of switching the power supply master according to the imaging mode as described above, for example, in the case where the imaging apparatus 100 is controlled from the external apparatus 200, by setting the processor 150 to serve as the power supply master, the power consumption of the processor 110 and the processor 130 can be suppressed.

Next, power control in each operation mode will be described. As shown in FIG. 1B, the processor 110, the processor 130, and the processor 150 include separate function blocks for different processing functions, and are capable of, for each function block, switching the power supply state to either a power ON state or a power save state. In this specification, the power ON state of a function block refers to, for example, a normal operation state or an active state, and the power save state refers to, for example, a low power consumption state such as a sleep state or a power supply shutoff state. Hereinafter, a description will be given focusing on the processor 110, but the other processors 130 and 150 also include separate function blocks for different processing functions, and provide power supply for each function block.

FIG. 1B is a block diagram showing a configuration for power control performed by the imaging apparatus 100. Power from the power supply unit 180 is supplied to a power supply distribution unit 129 of the processor 110. The power supply distribution unit 129 distributes the power from the power supply unit 180 to the function blocks of the processor 110. In Embodiment 1, the function blocks of the processor 110 are provided as described below, but the method for dividing the function blocks is not limited thereto.

CPU block 211: a block that includes the CPU 123 and the internal memory 126, and performs overall control and management on the following functions as a result of the CPU executing a program.

Image processing block 212: a block that includes the image processing unit 113 and the memory control unit 115, and performs image processing on an image signal supplied from a one directional communication receiving block 213, and stores the result in the memory 120.

One directional communication receiving block 213: a block that includes the input unit 111 and the path selection unit 112, and supplies a signal that has been input via the input unit 111 to an image processing block 212, a one directional communication transmitting block 214, a display block 217, and the like.

One directional communication transmitting block 214: a block that includes the confluence unit 116 and the output unit 117, and outputs a signal received from the image processing block 212, the one directional communication receiving block 213, and the like to the outside (for example, a processor connected to the downstream side).

Bidirectional communication upstream block 215: a block that includes the input/output unit 118, and implements bidirectional communication with the outside (for example, a processor connected to the upstream side).

Bidirectional communication downstream block 216: a block that includes the input/output unit 119, and implements bidirectional communication with the outside (for example, a processor connected to the downstream side).

Display block 217: a block that includes the display control unit 122, and controls display on the display unit 102.

Record reproduction block 218: a block that includes the record reproduction unit 121, and controls data writing and readout to and from the storage medium 103 in which image data is stored.

External communication block 219: a block that includes the external communication unit 125, and implements communication with the external apparatus 200.

Also, the CPUs 123, 143 and 163 of the processors 110, 130 and 150 are connected with a communication line 171 so as to be capable of communication with each other. The processor serving as the power supply master transmits a notification of the operation mode to the other processors via the communication line 171 and thereby instructs the other processors to execute power control. For example, in the case where the processor 110 serves as the power supply master, the CPU 123 activates the CPU 143 and the CPU 163 by using the communication line 171 so as to notify the operation mode. Hereinafter, a configuration will be described in which a CPU that has received an activation instruction via the communication line 171 is activated to execute power control according to the notified operation mode (to control the power supply state of the function blocks), but the configuration is not limited thereto. For example, the notification of the operation mode may function as the activation instruction. Also, the processor serving as the power supply master may transmit, instead of the notification of the operation mode, signals indicative of the power supply state of the function blocks to the other processors. In FIGS. 1A-1 to 1A-3, the communication line 171 is realized by a serial communication unit (not shown) such as I2C (Inter-Integrated Circuit), SPI (Serial Peripheral Interface), etc. provided in each processor.

FIGS. 3A to 3D and FIGS. 4A to 4D show the power supply master and the power supply state of the function blocks of each processor per operation mode of the imaging apparatus 100. In FIGS. 3A to 3D and FIGS. 4A to 4D, the power save state of each function block is represented by "OFF", and the power ON state is represented by "ON".

FIGS. 3A to 3D show relationships between the power supply master and the power supply state of the function blocks of each processor per operation mode when the imaging apparatus 100 performs operation in response to an input of an instruction from the instruction input unit 104. FIGS. 3A, 3B, 3C and 3D respectively correspond to the standby mode, the still image imaging mode, the moving image imaging mode, and the reproduction mode. The still image capturing mode and the moving image capturing mode constitute a recording mode for recording an image on a storage medium 103. The power supply state of each function block is controlled by the CPU (123, 143, 163) of each processor (110, 130, 150) controlling the power supply distribution unit (129, 149, 169) according to the operation mode notified from the processor serving as the power supply master.

As described with reference to FIG. 2, the processor 110 connected to the instruction input unit 104 serves as the power supply master in the modes operated in response to an input of an instruction from the instruction input unit 104. In the case where the operation mode is a mode that is operated in response to an input of an instruction from the instruction input unit 104 and is the standby mode, as shown in FIG. 3A, the CPU block 211 of the processor 110 connected to the instruction input unit 104 is brought into a power ON state, and the other blocks are brought into a power save state. In the processors 130 and 150, all of their function blocks are brought into a power save state.

That is, when the operation mode of the imaging apparatus 100 is set to the standby mode, the CPU 123 transmits a notification indicating that the operation mode is the standby mode to the CPU 143 of the processor 130 and the CPU 163 of the processor 150. In the present embodiment, for example, in an operation mode other than the standby mode, if an imaging instruction or a reproduction instruction is not input from the instruction input unit 104 for a predetermined length of time, the CPU 123 detects the fact, and the operation mode is transitioned to the standby mode.

Upon receiving the notification of the standby mode from the CPU 123, the CPU 143 controls the power supply distribution unit 149 so as to stop the power supply to all of the function blocks of the processor 130 and bring the function blocks into a power save state. Also, the CPU 143 provides an instruction to switch to a sleep state to the power supply distribution unit 149. Upon receiving the instruction to switch to a sleep state from the CPU 143, the power supply distribution unit 149 lowers the power supplied to the CPU block 231 to a level sufficient for the CPU 143 to detect a notification from the CPU 123, and thereby brings the CPU block 231 into a power save state.

Upon receiving the notification of the standby mode from the CPU 123, the CPU 163 controls the power supply distribution unit 169 so as to stop the power supply to all of the function blocks of the processor 150 and bring the function blocks into a power save state. Also, the CPU 163 provides an instruction to switch to a sleep state to the power supply distribution unit 169. Upon receiving the instruction to switch to a sleep state from the CPU 163, the power supply distribution unit 169 lowers the power supplied to the CPU block 251 to a level sufficient for the CPU 163 to detect a notification from the CPU 123, and thereby brings the CPU block 251 into a power save state.

Switching of the power supply state of each function block when the operation mode is set to the still image imaging mode will be described with reference to FIG. 3B. In the still image imaging mode, only the processor 110 connected to the imaging unit 101 can perform image processing on still image data output from the imaging unit 101, and the image processing functions of the processor 130 and the processor 150 are not used. The processor 130 only relays an image signal from the processor 110 in the preceding stage to the processor 150 in the next stage. The processor 150 writes the image signal into the storage medium 103.

Upon receiving an instruction of the still image imaging mode from the instruction input unit 104, the CPU 123 of the processor 110 starts power supply to necessary function blocks of the processor 110. Also, the CPU 123 brings some of the function blocks of the processor 130 and the processor 150 that are required for the still image imaging mode into a power ON state, and transmits an activation instruction and a notification indicating that the operation mode is the still image imaging mode to the CPUs 143 and 163, so as to bring unnecessary function blocks into a power save state.

Upon receiving a notification of the still image imaging mode from the instruction input unit 104, the CPU 123 of the processor 110 controls the power supply distribution unit 129 so as to control the power supply state of the function blocks as described below. To be specific, the CPU 123 performs the following operations of:

acquiring an image signal from the imaging unit 101, and bringing the one directional communication receiving block 213 into a power ON state so as to transmit the image signal to the image processing unit 113;

bringing the image processing block 212 into a power ON state so as to cause the image processing unit 113 to process the image signal;

bringing the display block 217 into a power ON state so as to cause the display control unit 122 to display a live view during imaging;

bringing the one directional communication transmitting block 214 into a power ON state so as to transmit the image signal processed by the image processing unit 113 to the processor 130 in the next stage; and bringing the bidirectional communication upstream block 215 and the bidirectional communication downstream block 216 into a power ON state so as to perform communication with the processors 130 and 150.

If the operation mode is the standby mode at the time when the CPU 123 outputs an activation instruction, the CPU 143 of the processor 130 is activated in response to the activation instruction received from the processor 110 (the CPU 123) via the communication line 171 so as to control power supply to the function blocks of the processor 130 as shown in FIG. 3B in accordance with the notification of the operation mode (still image imaging mode). The power supply distribution unit 149 constantly supplies power to the CPU block 231, and the power save state of the CPU block 231 means a so-called sleep state of the CPU 143. If the operation mode is the standby mode at the time when the CPU 123 outputs an activation instruction, the CPU 143 is activated in response to the activation instruction, and then transmits, to the power supply distribution unit 149, an instruction to switch the CPU block 231 to a power ON state. Then, power in the power ON state is supplied from the power supply distribution unit 149 to the CPU block 231, and the CPU 143 is thereby brought into a power ON state. If the operation mode is an operation mode other than the standby mode at the time when the CPU 123 outputs an activation instruction, the CPU 143 is already in a power ON state. The CPU 143 controls the power supply distribution unit 149 so as to bring a one directional communication receiving block 233 and a one directional communication transmitting block 234 into a power ON state in order to transfer the image signal received from the processor 110 to the processor 150 in the next stage. The image signal received from the processor 110 is treated as an on-fly signal, and transmitted to the processor 150 in the next stage. Because the image processing unit 133 does not perform image processing, an image processing block 232 remains in a power save state. Also, the CPU 143 brings a bidirectional communication upstream block 235 and a bidirectional communication downstream block 236 into a power ON state in order to perform communication with the processors 110 and 150 that are adjacent to the processor 130.

If the operation mode is the standby mode at the time when the CPU 123 outputs an activation instruction, the CPU 163 of the processor 150 is activated in response to the activation instruction from the processor 110, and then transmits, to the power supply distribution unit 169, an instruction to switch the CPU block 251 to a power ON state. Then, power in the power ON state is supplied from the power supply distribution unit 169, and the CPU block 251 is thereby brought into a power ON state. If the operation mode is an operation mode other than the standby mode at the time when the CPU 123 outputs an activation instruction, the CPU 163 is already in a power ON state. The CPU 163 controls the power supply distribution unit 169 so as to control power supply to the function blocks of the processor 150 in accordance with the notification of the operation mode (still image imaging mode). To be specific, the CPU 163 performs the following operations of:

bringing a one directional communication receiving block 253 into a power ON state so as to receive an image signal from the processor 130;

bringing a record reproduction block 258 into a power ON state so as to write the image signal received from the processor 130 into the storage medium 103;

bringing a bidirectional communication upstream block 255 and a bidirectional communication downstream block 256 into a power ON state so as to perform communication with the processors 130 and 110;

bringing an image processing block 252 into a power save state because the image processing unit 153 is not used; and bringing a one directional communication transmitting block 254 into a power save state because there is no processor in the next stage.

Next, switching of the power supply state of each function block when the operation mode is set to the moving image imaging mode will be described with reference to FIG. 3C. In the moving image imaging mode, image processing is performed by the processor 110, the processor 130, and the processor 150 in a shared manner. More specifically, an image processor other than an image processor in a final stage among the plurality of image processors performs the predetermined image processing on image data of a portion that needs to be processed by the image processor, and outputs image data of a portion other than the portion that needs to be processed by the image processor to an image processor in a subsequent stage without performing the predetermined image processing thereon. The image processor of the final stage (processor 150) performs predetermined image processing on the image data of the portion to be processed and records on the storage medium 103. Accordingly, in each processor, power supply is controlled as described below.

First, upon receiving an instruction of the moving image imaging mode from the instruction input unit 104, the CPU 123 of the processor 110 provides power supply to necessary function blocks, and at the same time transmits, to the processor 130 and the processor 150, an activation instruction and a notification of the operation mode (moving image imaging mode). The power supply state of the function blocks of the processor 110 is the same as in the case of the still image imaging mode (FIG. 3B). If the operation mode is the standby mode at the time when the CPU 123 outputted the activation instruction, as in the still image imaging mode, the CPU 143 is activated in response to the activation instruction from the CPU 123, and brought into a power ON state, and thereafter individually controls power supply state to each of the function blocks in accordance with the instruction of the moving image imaging mode.

In the processor 130, the CPU 143 in the power ON state controls the power supply state of the function blocks as described below in accordance with the notification of the moving image imaging mode:

acquiring an image signal from the processor 110 (the output unit 117) in the preceding stage, and bringing the one directional communication receiving block 233 into a power ON state so as to transmit the image signal to the image processing unit 133;

bringing the image processing block 232 into a power ON state so as to cause the image processing unit 133 to execute image processing on the image signal;

bringing the one directional communication transmitting block 234 into a power ON state so as to transfer the image signal processed by the image processing unit 133 and the image signal received from the processor 110 to a processor in the next stage; and bringing the bidirectional communication upstream block 235 and the bidirectional communication downstream block 236 to a power ON state so as to cause the input/output units 138 and 139 to perform communication with adjacent processors.

In the processor 150 as well, if the operation mode is the standby mode at the time when the CPU 123 outputted the activation instruction, as in the still image imaging mode, the CPU 163 is activated in response to the activation instruction from the CPU 123, and brought into a power ON state, and thereafter controls power supply to the function blocks in accordance with the instruction of the moving image imaging mode. In the processor 150, the CPU 163 in the power ON state controls the power supply distribution unit 169 based on the notification of the moving image imaging mode, and controls the power supply state of the function blocks such that the processor 150 is adapted to the moving image imaging mode. As shown in FIG. 3C, the CPU 163 that has received the notification of the moving image imaging mode brings the image processing block 252 into a power ON state in order to perform image processing, and the other blocks remain the same as in the still image imaging mode.

Next, switching of the power supply state of each function block when the operation mode is set to the reproduction mode will be described with reference to FIG. 3D. In the reproduction mode, the processor 150 reads out image data recorded in the storage medium 103 and transmits the image data to the processor 110, and the processor 110 outputs the image data received from the processor 150 to the display unit 102. In the configuration of Embodiment 1 (FIGS. 1A-1 to 1B), the processor 130 is not used in the reproduction mode. Upon receiving an instruction of the reproduction mode from the instruction input unit 104, the CPU 123 of the processor 110 transmits, to the CPUs 143 and 163 of the processors 130 and 150, an activation instruction and a notification of the operation mode (reproduction mode). Upon receiving the notification of the reproduction mode, the CPU 143 of the processor 130 brings the function blocks of the processor 130 into a power save state, and then makes a transition to a sleep state. In this way, the order of power control for the processors may be changed according to the state of function blocks in the operation mode before switching is performed and the state of function blocks in the operation mode after switching is performed.

In the processor 110, upon receiving the instruction of the reproduction mode from the instruction input unit 104, the CPU 123 performs the following operations:

bringing the bidirectional communication upstream block 215 into a power ON state so as to exchange data with the processor 150;

bringing the bidirectional communication downstream block 216 into a power save state because the processor 130 is not used; and bringing the display block 217 into a power ON state so as to display the reproduced image on the display unit 102.

In the processor 150, if the operation mode is the standby mode at the time when the CPU 123 outputted the activation instruction, the CPU 163 is activated in response to the activation instruction from the CPU 123, and brought into a power ON state, and thereafter controls power supply to the function blocks in accordance with the instruction of the reproduction mode. Upon receiving the notification of the reproduction mode, the CPU 163 in the power ON state performs the following operations:

bringing the record reproduction block 258 into a power ON state in order for the record reproduction unit 161 to read out image data from the storage medium 103 and reproduce the image data; and bringing the bidirectional communication downstream block 256 into a power ON state so as to exchange data with the processor 110 (to transmit the image data (reproduction data) processed by the record reproduction unit 161 to the processor 110).

As a result of power control of the function blocks as described above, in the reproduction mode, the CPU 163 of the processor 150 reads out image data from the storage medium 103 by using the record reproduction unit 161, reproduces the image data, and transmits the reproduction data to the processor 110 via the input/output unit 159. The processor 110 receives the reproduction data from the processor 150 via the input/output unit 118, and the display control unit 122 displays the received reproduction data on the display unit 102.

Up to here, control of power supply in each operation mode when the imaging apparatus 100 performs operation in response to an input of an instruction from the instruction input unit 104 has been described. Next, a description will be given of control of power supply in each operation mode when the imaging apparatus 100 performs operation in response to an instruction from the external apparatus 200. FIGS. 4A to 4D show the power supply master and the power supply state of the function blocks of each processor per operation mode when the imaging apparatus 100 performs operation in response to an instruction from the external apparatus 200. FIGS. 4A, 4B, 4C, and 4D respectively correspond to the external control standby mode, the external control still image imaging mode, the external control moving image imaging mode, and the external control reproduction mode.

As shown in FIGS. 1A-1 to 1A-3, in the imaging apparatus 100, the external apparatus 200 is connected to the processor 150, and an instruction from the external apparatus 200 is detected by the processor 150. As described with reference to FIG. 2, the processor 150 connected to the external apparatus 200 serves as the power supply master in the modes operated in response to an input of an instruction from the external apparatus 200. Upon receiving an instruction of the operation mode, the CPU 163 of the processor 150 transmits, to the processor 130 and the processor 110, an activation instruction and a notification of the operation mode. If the operation mode is the external control standby mode for waiting for an instruction from the external apparatus 200, as shown in FIG. 4A, the CPU block 251 and an external communication block 259 of the processor 150 are brought into a power ON state, and the other function blocks are in a power save state. In the processors 110 and 130, all of the function blocks are in a power save state.

If the operation mode is the external control still image imaging mode, the external control moving image imaging mode, or the external control reproduction mode, the power supply state of the function blocks is controlled as shown in FIGS. 4B to 4D, respectively. The power supply state of the function blocks shown in FIGS. 4B to 4D is the same as in FIGS. 3B to 3D except that the external communication block of the processor 150 is brought into a power ON state. Also, for example, in the standby mode (FIG. 3A) for waiting for an instruction from the instruction input unit 104, if an instruction of the external control moving image imaging mode is issued, first, the processor serving as the power supply master is switched from the processor 110 to the processor 150. After that, the CPU 163 of the processor 150 that has been set as the power supply master performs power control for each processor. As described above with reference to FIGS. 3A to 3D and FIGS. 4A to 4D, in response to an instruction from the processor that has been set as the power supply master, in each processor, some of the function blocks required for the operations in the operation mode after switching is performed are brought into a power ON state, and the other function blocks are brought into a power save state. Accordingly, power consumption can be reduced.

A flow of power control (control of power supply state of the function blocks) according to an embodiment will be described next. FIG. 5 is a timing chart showing a flow of power control when the operation mode of the imaging apparatus 100 is switched in the following order: the standby mode→the still image imaging mode→the moving image imaging mode→the reproduction mode in the case where the imaging apparatus 100 is controlled from the instruction input unit 104. FIG. 6 shows a flow of power control when the operation mode of the imaging apparatus 100 is switched in the following order: the external control standby mode-→the external control still image imaging mode→the external control moving image imaging mode→the external control reproduction mode in the case where the imaging apparatus 100 is controlled from the external apparatus 200.

First, a description will be given of an example of operations performed when the operation mode is switched in accordance with the instruction of the operation mode from the instruction input unit 104 with reference to the timing chart shown in FIG. 5. It is assumed here that the timing chart starts from a state in which the operation mode of the imaging apparatus 100 is the standby mode. In this state, the function blocks of the processors 130 and 150 are in a power save state, and the CPUs 143 and 163 are in a sleep state. At time T511, when the user controls the instruction input unit 104 to provide an instruction of the still image imaging mode, the CPU 123 of the processor 110 detects the instruction (the instruction of the still image imaging mode) from the user. Then, the CPU 123 of the processor 110 controls the power supply state of the function blocks of the processor 110 as shown in FIG. 3B by using the power supply distribution unit 129.

At time T512 after the elapse of a predetermined length of time after time T511 at which the instruction of the still image imaging mode was received by the instruction input unit 104, the CPU 123 transmits, to the processor 130, a CPU activation instruction and a notification of the still image imaging mode. Upon receiving the instruction of the still image imaging mode, the CPU 123 measures an elapsed time from time T511 at which the instruction of the still image imaging mode was received. Then, when a first predetermined length of time elapses from time T511 at which the instruction of the still image imaging mode was received, at time T512, the CPU 123 transmits, to the CPU 143, an activation instruction and an instruction of the still image imaging mode. The CPU 143 that has been activated in response to the activation instruction controls the power supply state of the function blocks of the processor 130 as shown in FIG. 3B in accordance with the notification of the still image imaging mode. Furthermore, when a second predetermined length of time elapses from time T511 at which the instruction of the still image imaging mode was received (the second predetermined length of time being longer than the first predetermined length of time), at time T513, the CPU 123 transmits, to the processor 150, an activation instruction for the CPU 163 and a notification of the still image imaging mode. The CPU 163 that has been activated in response to the activation instruction controls the power supply state of the function blocks of the processor 150 as shown in FIG. 3B in accordance with the notification of the still image imaging mode. In this way, the CPU 123 measures an elapsed time from when the instruction of the still image imaging mode was received, and sequentially performs transmission of an activation instruction and a notification of the operation mode to the processor 130 and to the processor 150 at different elapsed times such as time T521 and time T522, as a result of which an inrush current generated when a plurality of processors are activated is suppressed.

Next, at time T521, when the user controls the instruction input unit 104 to provide an instruction of the moving image imaging mode, the CPU 123 of the processor 110 detects the instruction. Then, the CPU 123 controls the power supply to the function blocks of the processor 110 as shown in FIG. 3C for the moving image imaging mode.

Upon receiving the instruction of the moving image imaging mode, the CPU 123 measures an elapsed time from time T521 at which the instruction of the moving image imaging mode was received. Then, when a first predetermined length of time elapses from time T521 at which the instruction of the moving image imaging mode was received, at time T522, the CPU 123 transmits, to the processor 130, an activation instruction for the CPU 143 and a notification of the moving image imaging mode. The CPU 143 that has been activated in response to the activation instruction controls the power supply state of the function blocks of the processor 130 as shown in FIG. 3C in accordance with the notification of the moving image imaging mode. Also, when a second predetermined length of time elapses from time T521 at which the instruction of the moving image imaging mode was received, at time T523, the CPU 123 transmits, to the processor 150, an activation instruction for the CPU 163 and a notification of the moving image imaging mode. The CPU 163 that has been activated in response to the activation instruction controls the power supply state of the function blocks of the processor 150 as shown in FIG. 3C in accordance with the notification of the moving image imaging mode.

Next, at time T531, when the user controls the instruction input unit 104 to provide an instruction of the reproduction mode, the processor 110 detects the instruction (the instruction of the reproduction mode). Then, the CPU 123 controls the power supply state of the function blocks of the processor 110 as shown in FIG. 3D for the reproduction mode.

Upon receiving the instruction of the reproduction mode, the CPU 123 measures an elapsed time from time T531 at which the instruction of the reproduction mode was received. Then, when a first predetermined length of time elapses from time T531 at which the instruction of the reproduction mode was received, at time T532, the CPU 123 transmits, to the processor 130, an activation instruction for the CPU 143 and a notification of the reproduction mode. As described with reference to FIG. 3D, the processor 130 is not used in the reproduction mode, and thus the CPU 143 brings the function blocks of the processor 130 into a power save state. The CPU block 231 is also brought into a power save state, and the CPU 143 will be on standby (sleep state) until an activation instruction is subsequently received from the processor serving as the power supply master. Also, when a second predetermined length of time elapses from time T531 at which the instruction of the reproduction mode was received, at time T533, the CPU 123 transmits, to the processor 150, an activation instruction for the CPU 163 and a notification of the reproduction mode. The CPU 163 that has been activated in response to the activation instruction controls the power supply state of the function blocks of the processor 150 as described in FIG. 3D in accordance with the notification of the reproduction mode.

As described above, in the case where the imaging apparatus 100 is controlled from the instruction input unit 104, the processor 110 connected to the instruction input unit 104 detects an instruction from the user, and serves as the power supply master that performs power control for the processor 110 itself and the other processors. In the foregoing, a configuration was described in which the CPUs 143 and 163 of the processors 130 and 150 are activated in response to an activation notification each time the mode is changed, but the activation instruction is ignored if these CPUs are already in operation. During the transition to the reproduction mode, if the processor 130 (the CPU 143) is already in a power save state, transmission of the activation instruction and the notification of the operation mode may be omitted. Whether or not the CPU 143 of the processor 130 is in a power save state can be identified from the current operation mode.

Next, switching of the operation mode in response to an instruction from the external apparatus 200 will be described with reference to the timing chart shown in FIG. 6. It is assumed here that the timing chart starts from a state in which the operation mode of the imaging apparatus 100 is the external control standby mode (FIG. 4A).

At time T611, when the user operates the external apparatus 200 to provide an instruction of the still image imaging mode, the CPU 163 of the processor 150 detects the instruction from the user. Then, upon receiving the instruction of the still image imaging mode from the external apparatus 200, the CPU 163 controls the power supply state of the function blocks of the processor 110 as shown in FIG. 4B.

Upon receiving the instruction of the still image imaging mode from the external apparatus 200, the CPU 163 measures an elapsed time from time T611 at which the instruction of the still image imaging mode was received. Then, when a first predetermined length of time elapses from time T611 at which the instruction of the still image imaging mode was received, at time T612, the CPU 163 transmits, to the processor 110, an activation instruction for the CPU 123 and a notification of the external control still image imaging mode. The CPU 123 that has been activated in response to the activation instruction controls the power supply state of the function blocks of the processor 110 as shown in FIG. 4B in accordance with the notification of the external control still image imaging mode. Next, when a second predetermined length of time elapses from time T611 at which the instruction of the still image imaging mode was received from the external apparatus 200, at time T613, the CPU 163 transmits, to the processor 130, an activation instruction for the CPU 143 and a notification of the external control still image imaging mode. The CPU 143 that has been activated in response to the activation instruction controls the power supply state of the function blocks of the processor 130 as shown in FIG. 4B in accordance with the notification of the external control still image imaging mode. In the external control still image imaging mode, image processing is performed by the processor 110, and thus control is performed such that the processor 110 is first brought into a power control state corresponding to the still image imaging mode. In this way, the order of processors to which the operation mode is notified may be defined in advance for each operation mode after switching is performed. Alternatively, the order of processors to which the operation mode is notified may be defined according to the combination of operation modes before and after switching is performed.

Next, at time T621, when the user operates the external apparatus 200 to provide an instruction of the moving image imaging mode, the external apparatus 200 outputs a signal indicative of the instruction of the moving image imaging mode. Upon detection of the signal, the CPU 163 of the processor 150 controls the power supply state of the function blocks of the processor 150 as shown in FIG. 4C.

Upon receiving an instruction of the moving image imaging mode from the external apparatus 200, the CPU 163 measures an elapsed time from time T621 at which the instruction of the moving image imaging mode was received. Then, when a first predetermined length of time elapses from time T621 at which the instruction of the moving image imaging mode was received from the external apparatus 200, at time T622, the CPU 163 transmits, to the processor 130, a notification of the external control moving image imaging mode. Upon receiving the notification of the external control moving image imaging mode, the CPU 143 controls the power supply state of the function blocks of the processor 130 as shown in FIG. 4C. In Embodiment 1, the power supply state of the function blocks of the processor 110 is not changed between the external control still image imaging mode and the external control moving image imaging mode. Accordingly, it is possible to omit power supply setting when switching is performed between these operation modes, and therefore in FIG. 6, transmission of a notification of the operation mode from the processor 150 to the processor 110 is omitted. As just described, whether or not to transmit a notification of the operation mode may be defined in advance according to the operation modes before and after switching is performed. Even in this case, it is of course possible to transmit a notification of the operation mode.

Next, at time T631, when the user operates the external apparatus 200 to provide an instruction of the reproduction mode, the CPU 163 of the processor 150 detects the instruction. Then, upon detection of the instruction, the CPU 163 controls the power supply state of the function blocks of the processor 150 as shown in FIG. 4D.

Upon receiving an instruction of the reproduction mode from the external apparatus 200, the CPU 163 measures an elapsed time from time T631 at which the instruction of the reproduction mode was received. Then, when a first predetermined length of time elapses from time T631 at which the instruction of the reproduction mode was received, at time T632, the CPU 163 transmits, to the processor 110, a notification of the external control reproduction mode. The CPU 123 of the processor 110 is already activated, and it is therefore possible to omit transmission of the activation instruction. Upon receiving the notification of the external control reproduction mode, the CPU 123 controls the power supply state of the function blocks of the processor 110 as shown in FIG. 4D. Next, when a second predetermined length of time elapses from time T631 at which the instruction of the reproduction mode was received from the external apparatus 200, at time T633, the CPU 163 transmits, to the processor 130, a notification of the external control reproduction mode. Upon receiving the notification of the external control reproduction mode, the CPU 143 of the processor 130 brings the function blocks of the processor 130 into a power save state as described in FIG. 4D.

As described above, in the case where the imaging apparatus 100 is controlled from the external apparatus 200, the processor 150 connected to the external apparatus 200 detects an instruction from the user (from the external apparatus 200), and serves as the power supply master that performs power control for the processor 150 itself and the other processors.

Next, a flow of power control performed by the processors 110, 130 and 150 will be described with reference to the flowchart shown in FIG. 7. In FIG. 7, the processing shown in steps S701 to S707 is processing performed by the CPU of the processor serving as the power supply master, and the processing shown in steps S721 to S726 is processing performed by the CPU of the processors that do not serve as the power supply master. Hereinafter, an example of operations will be described in the case where the processor 110 (the CPU 123) serves as the power supply master.

First, in S701, the CPU 123 of the power supply master determines whether or not an instruction of the operation mode has been received from the instruction input unit 104 and it is necessary to change the operation mode to the operation mode indicated by the instruction. In S701, if it is determined that it is necessary to change the operation mode to the operation mode indicated by the instruction, the processing proceeds to S703. In S703, the CPU 123 references to a power supply master table stored in the internal memory 126, and determines whether or not the processor 110 still serves as the power supply master even after the operation mode is changed. If it is determined that the processor 110 still serves as the power supply master even after the operation mode is changed, the processing proceeds from S704 to S705, and the CPU 123 executes power control so as to control the power supply state of the function blocks of the processor 110 according to the changed operation mode. Then, in S706, the CPU 123 transmits an activation instruction and a notification of the operation mode as shown in FIG. 5 in order to execute power control for the other processors.

On the other hand, if it is determined in S704 that the processor 110 does not serve as the power supply master in the changed operation mode, in S707, the CPU 123 activates the CPU of the processor that serves as the power supply master in the changed operation mode, and transmits an instruction to change the power supply master. The communication is performed, for example, via the communication line 171. The CPU of the processor that has received the instruction to change the power supply master serves as the power supply master, and performs power control according to the changed operation mode. The CPU 123 relinquishes the power supply master status. For example, in the case where an instruction of the external control standby mode is issued, the CPU 123 references to the power supply master table and determines that the processor 150 serves as the power supply master in the next operation mode. Then, the CPU 123 activates the CPU 163 of the processor 150, and transmits an instruction to serve as the power supply master. After that, the processor 150 performs operation as the power supply master, and controls the power supply state of the function blocks of each processor to be in a state according to the designated operation mode.

If it is determined in S701 that an instruction of the operation mode has not been received, in S702, the CPU 123 determines whether or not a notification to change the operation mode has been received from the other processors. If it is determined in S702 that a notification to change the operation mode has been received from the other processors, the CPU 123 causes the processing to proceed to S703. The processing after S703 is the same as described above. If it is determined in S702 that a notification to change the operation mode has not been received from the other processors, the CPU 123 causes the processing to return to S701.

Next, a description will be given of operations performed by the CPU of a processor other than the processor designated as the power supply master. Here, an example will be described in which the processor 150 is not the power supply master.

The CPU 163 of the processor 150 determines, for example, whether an instruction of the operation mode has been output from the external apparatus 200. As described in FIGS. 3A to 3D, in the case where the processor 110 is the power supply master, the external communication block 219 of the processor 150 is in a power save state. In Embodiment 1, when the external communication unit 165 receives a signal from the external apparatus 200 (S721), the external communication block 219 and the CPU block 211 are activated, and S722 is executed. In S722, the CPU 163 transmits a notification to change the operation mode to the operation mode indicated by the instruction received from the external apparatus 200. In response to the notification, the CPU 123 of the processor 110 serving as the power supply master at that point in time causes the processing to branch from S702 to S703.

Upon receiving a power control instruction (a CPU activation instruction and a notification of the operation mode) from the CPU of the power supply master, the CPU 163 is activated, and the processing proceeds from S723 to S724. In S724, the CPU 163 controls the power supply state of the function blocks of the processor 150 according to the operation mode indicated by the notification. Also, in S725, upon receiving an instruction to change the power supply master from the CPU of the power supply master, the CPU 163 is activated, and sets the CPU 163 itself to be the power supply master in S726. After this processing, the CPU 163 (the processor 150) performs operation as the power supply master.

As described above, according to Embodiment 1, in the imaging apparatus 100 including a plurality of processors, each processor controls power supply to the function blocks of the processor according to the operation mode. Also, a processor other than the processor serving as the power supply master controls the power supply to the function blocks of the processor according to the operation mode indicated by the notification from the power supply master. The power supply master is changed according to the operation mode of the imaging apparatus 100. Also, the power supply master changes the order of processors to which the operation mode is notified according to the operation mode of the imaging apparatus 100. As a result of these operations being performed, it is possible to suppress power consumption of a processor(s) that is unnecessary in the operation mode of the imaging apparatus 100 or the function blocks of such a processor(s).

Also, rather than simultaneously turning on power control for the plurality of processors, the power supply state of each function block is controlled at different times, and it is thereby possible to suppress an inrush current.

In Embodiment 1, an example was described in which a plurality of processors are configured in cascade, but modification is possible such as a ring or star configuration. Also, in Embodiment 1, the plurality of processors are described as devices of the same type, but they may be devices of different types. Furthermore, Embodiment 1 is configured such that power control is performed according to the operation mode of the imaging apparatus 100, but power control may be performed according to the amount of data output from the image sensor, or in other words, the amount of data to be processed.

Also, Embodiment 1 is configured such that transmission of an activation instruction or a notification of the operation mode is performed by using the communication line 171, but the configuration is not limited thereto. For example, transmission of an activation instruction or a notification of the operation mode may be performed by using bidirectional communication connection between processors. In this case, however, the bidirectional communication upstream block and the bidirectional communication downstream block of each processor need to be constantly in a power ON state. Also, Embodiment 1 is configured such that the CPU of the processor serving as the power supply master transmits, to the CPUs of the other processors, a notification of the operation mode or the power supply state of the function blocks, but the configuration is not limited thereto. For example, the power supply state of the function blocks may be controlled by the CPU of the processor serving as the power supply master transmitting, directly to the power supply distribution units (FIG. 1B) of the other processors, a notification of the operation mode or the power supply state of the function blocks.

Also, in Embodiment 1, a configuration was described in which the imaging unit 101, the display unit 102, and the instruction input unit 104 are connected to the processor 110 in the first stage, and the storage medium 103 and the external apparatus 200 are connected to the processor 150 in the final stage, but the present invention is not limited thereto. For example, the external apparatus 200 may be connected to the processor 110. In this case, the processor 110 serves as the power supply master irrespective of whether the mode is a mode in which a control instruction from the instruction input unit 104 is received or a mode in which a control instruction is received from the external apparatus 200.

Also, according to Embodiment 1, the order of power control for the processors is determined in accordance with the flow of data determined according to the operation mode as well as the processor to which the imaging unit 101, the display unit 102, and the storage medium 103 are connected. For example, in the configuration shown in FIGS. 1A-1 to 1A-3, in the still image imaging mode and the moving image imaging mode, image data flows from the imaging unit 101 to the storage medium 103. Accordingly, when the still image imaging mode or the moving image imaging mode is designated, the processor serving as the power supply master controls the power supply state according to the operation mode indicated by the instruction sequentially from the processor in the first stage of the cascade connection to the processor in the final stage. Also, for example, in the case of a configuration in which the display unit 102 is connected to the processor 130 and the operation mode is the reproduction mode, image data flows from the storage medium 103 to the display unit 102. Accordingly, when the reproduction mode is designated, the processor serving as the power supply master performs power control sequentially from the processor 150 to the processor 130.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-142719, filed Jul. 20, 2016, and 2017-111170, filed Jun. 5, 2017, which are hereby incorporated by reference herein in their entirety.

What is claimed is:

1. An image processing apparatus comprising:
an imaging unit;
serially connected image processors, wherein a first stage processor included in the image processors is connected to the imaging unit;
a mode instruction circuitry that provides an instruction to select one of operation modes including a moving image capture mode, wherein in the moving image capture mode, each of image processors other than a final stage processor included in the image processors performs a predetermined image processing on a portion of image data that needs to be processed, and outputs the processed portion of the image data and a remaining portion of the image data to a subsequent image processor without performing the predetermined image processing on the remaining portion of the image data; and
a power supply unit that supplies power to the image processors,
wherein one of the image processors is set as a power supply master, and
the image processor that has been set as the power supply master performs control so as to sequentially bring the image processors into the power supply state corresponding to the operation mode indicated by the mode instruction circuitry, wherein the control includes measuring first and second predetermined time periods from receipt of the instruction, transmitting a first activation instruction and a first notification of the selected operation mode to a first of the serially connected image processors when the first predetermined time period elapses, and transmitting a second activation instruction and a second notification of the selected operation mode to a second of the serially connected processors when the second predetermined time period elapses.

2. The image processing apparatus according to claim 1, wherein the mode instruction circuitry is connected to one of the image processors, and
the image processor connected to the mode instruction circuitry is set as the power supply master.

3. The image processing apparatus according to claim 2, wherein the mode instruction circuitry is connected to the first stage processor.

4. The image processing apparatus according to claim 1, wherein the image processors bring function blocks required for an operation mode indicated by the instruction provided by the mode instruction circuitry into a power ON state, and bring function blocks other than the function blocks required for the operation mode indicated by the instruction into a power save state.

5. The image processing apparatus according to claim 1, wherein the image processor that has been set as the power supply master changes an order of the image processors that are brought into a power supply state corresponding to the indicated operation mode according to an operation mode indicated by the instruction.

6. The image processing apparatus according to claim 1, wherein an external apparatus is connected to one of the image processors,
the external apparatus outputs a signal for providing an instruction of an operation mode of the image processing apparatus, and
when the image processing apparatus is operated in the operation mode indicated by the instruction provided by the external apparatus instead of the mode instruction circuitry, the image processor connected to the external apparatus is set as the power supply master.

7. The image processing apparatus according to claim 1, wherein when the moving image capture mode is indicated by the mode instruction circuitry, the image processor that has been set as the power supply master performs control so as to bring the image processors into the power supply state corresponding to the moving image capture mode sequentially from the first stage processor to the final stage processor.

8. The image processing apparatus according to claim 1, wherein the operation modes include a reproduction mode in which image data is reproduced from the storage medium,
a recording unit is connected to the final stage processor, and a display apparatus is connected to one of the image processors, and
when the reproduction mode is indicated by the mode instruction circuitry, the image processor that has been set as the power supply master performs control so as to bring the image processors into the power supply state corresponding to the reproduction mode sequentially from the final stage processor to the image processor connected to the display apparatus.

9. The image processing apparatus according to claim 1, wherein in response to the mode instruction circuitry providing the instruction, the image processor that has been set as the power supply master transmits information indicative of an operation mode indicated by the instruction sequentially to image processors other than the power supply master, and
each of the image processors other than the power supply master changes the power supply state of function blocks of the image processor according to the information indicative of the operation mode transmitted from the image processor that has been set as the power supply master.

10. The image processing apparatus according to claim 1, wherein each of the image processors stores information indicative of image processors that are set as the power supply master in the operation modes.

11. The image processing apparatus according to claim 1, wherein each of the image processors is configured as a single-chip semiconductor integrated circuit.

* * * * *